United States Patent
Pringle, IV et al.

(10) Patent No.: US 10,456,803 B2
(45) Date of Patent: Oct. 29, 2019

(54) METHODS OF REMOVING A GLUTINOUS SUBSTANCE FROM AN APPLICATOR

(71) Applicant: The Boeing Company, Chicago, IL (US)

(72) Inventors: John Walter Pringle, IV, Gardena, CA (US); Angelica Davancens, Reseda, CA (US); Raul Tomuta, Stanton, CA (US); Marcos Robert Vaughn Espinosa, Glenn Dale, MD (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/138,833

(22) Filed: Sep. 21, 2018

(65) Prior Publication Data

US 2019/0022690 A1     Jan. 24, 2019

Related U.S. Application Data

(62) Division of application No. 15/460,164, filed on Mar. 15, 2017, now Pat. No. 10,081,031.

(51) Int. Cl.
     *B05C 5/02*      (2006.01)
     *B05C 17/005*    (2006.01)
     (Continued)

(52) U.S. Cl.
     CPC .............. *B05C 5/02* (2013.01); *B05C 5/0229* (2013.01); *B05C 17/002* (2013.01);
     (Continued)

(58) Field of Classification Search
     CPC ....... B05C 5/02; B05C 5/0229; B05C 17/002; B05C 17/00506; B05C 17/00509;
     (Continued)

(56) References Cited

U.S. PATENT DOCUMENTS 2,670,241 A * 2/1954 Pyles ................. B05B 1/3046
                                                   239/525
2,768,861 A * 10/1956 Keely ................. B05C 17/002
                                                   239/337

(Continued)

FOREIGN PATENT DOCUMENTS

CN      201161222 Y      12/2008
DE        951478 C      10/1956
(Continued)

OTHER PUBLICATIONS

European Patent Office, Extended European Search Report in European Patent Application No. 16162094.3-1760, dated Aug. 10, 2016, 6 pages.

(Continued)

*Primary Examiner* — David P Angwin
*Assistant Examiner* — Bob Zadeh
(74) *Attorney, Agent, or Firm* — Kolisch Hartwell, P.C.

(57) ABSTRACT

A method of removing a glutinous substance from an applicator comprises removing a plunger before the glutinous substance has solidified; allowing the glutinous substance to solidify inside the applicator; detaching a side cover from a base portion of a first body portion to expose a first sealant plug; severing the first sealant plug from a second sealant plug; severing the first sealant plug from a third sealant plug; detaching a tip portion of the applicator from a second body portion to expose a portion of the second sealant plug; extracting the second sealant plug from the second body portion by pulling the portion of the second sealant plug in a direction along the second body portion; separating the first sealant plug from the base portion of the first body portion; and extracting the third sealant plug from an end-effector interface of the first body portion.

20 Claims, 17 Drawing Sheets

(51) Int. Cl.
*B05C 17/00* (2006.01)
*F16K 31/00* (2006.01)
*B05B 1/30* (2006.01)

(52) U.S. Cl.
CPC ...... *B05C 17/00506* (2013.01); *B05B 1/3046* (2013.01); *B05B 1/3073* (2013.01); *B05C 5/0225* (2013.01); *B05C 17/00509* (2013.01); *F16K 31/00* (2013.01)

(58) Field of Classification Search
CPC ... B05C 5/0225; B05B 1/3046; B05B 1/3073; F16K 31/00
See application file for complete search history.

(56) References Cited

U.S. PATENT DOCUMENTS

| | | | | |
|---|---|---|---|---|
| 3,463,363 | A | * | 8/1969 | Zelna ................ B05B 1/3046 222/334 |
| 3,971,492 | A | | 7/1976 | Lockwood |
| 4,245,759 | A | * | 1/1981 | Baker ............. B05C 17/00523 219/230 |
| 4,778,642 | A | | 10/1988 | Lee et al. |
| 4,964,362 | A | | 10/1990 | Dominguez |
| 5,747,102 | A | * | 5/1998 | Smith ................. B05C 5/001 427/98.4 |
| 5,871,123 | A | | 2/1999 | Thomas |
| 5,908,644 | A | | 6/1999 | Poole |
| 6,001,181 | A | | 12/1999 | Bullen |
| 7,963,246 | B1 | | 6/2011 | Brinker |
| 7,980,197 | B2 | | 7/2011 | Prentice et al. |
| 8,225,964 | B2 | | 7/2012 | Clark |
| 8,651,046 | B1 | | 2/2014 | Davancens et al. |
| 9,016,530 | B2 | | 4/2015 | Topf et al. |
| 9,346,074 | B2 | | 5/2016 | Hogan et al. |
| 10,029,275 | B2 | | 7/2018 | Pringle, IV et al. |
| 10,081,031 | B1 | * | 9/2018 | Pringle ................ B05C 5/02 |
| 2002/0112821 | A1 | * | 8/2002 | Inaba ................ B05C 5/001 156/359 |
| 2003/0205589 | A1 | * | 11/2003 | Righolt .............. B05C 5/02 222/504 |
| 2006/0157517 | A1 | | 7/2006 | Fiske et al. |
| 2006/0278666 | A1 | * | 12/2006 | Wang ................ B05C 5/0229 222/504 |
| 2008/0105703 | A1 | * | 5/2008 | Prentice ............. B05C 5/0225 222/63 |
| 2008/0128430 | A1 | | 6/2008 | Kovach et al. |
| 2009/0308892 | A1 | * | 12/2009 | Clark ................ B05B 12/0026 222/153.14 |
| 2013/0207348 | A1 | | 8/2013 | Smeets |
| 2014/0326760 | A1 | * | 11/2014 | Topf .................. B05C 5/0225 222/559 |
| 2016/0279863 | A1 | | 9/2016 | Trend et al. |
| 2016/0325304 | A1 | | 11/2016 | Pham et al. |
| 2016/0325307 | A1 | | 11/2016 | Atsebha et al. |
| 2017/0008024 | A1 | | 1/2017 | Weinmann et al. |
| 2017/0106395 | A1 | | 4/2017 | Pringle, IV et al. |
| 2017/0106398 | A1 | | 4/2017 | Pringle, IV et al. |
| 2019/0022690 | A1 | * | 1/2019 | Pringle, IV ............ B05C 5/02 |

FOREIGN PATENT DOCUMENTS

| | | |
|---|---|---|
| DE | 202008003757 U1 | 9/2009 |
| EP | 0889108 A1 | 1/1999 |
| EP | 2837430 A2 | 2/2015 |
| GB | 2524508 A | 9/2015 |
| WO | 0226397 A1 | 4/2002 |
| WO | 2012084238 A1 | 6/2012 |
| WO | 2014063806 A1 | 5/2014 |
| WO | 2014179015 A1 | 11/2014 |

OTHER PUBLICATIONS

U.K. Intellectual Property Office, Combined Search and Examination Report under Sections 17 and 18(3) in UK Patent Application No. GB1609279.3, dated Nov. 10, 2016, 6 pages.
European Patent Office—Netherlands, Netherlands Search Report and Written Opinion regarding Netherlands Application No. NL2018692, dated Dec. 7, 2017, 10 pages.
European Patent Office, European Search Report regarding European Patent Application No. 18155715.8-1015, dated May 7, 2018, 4 pages.

* cited by examiner

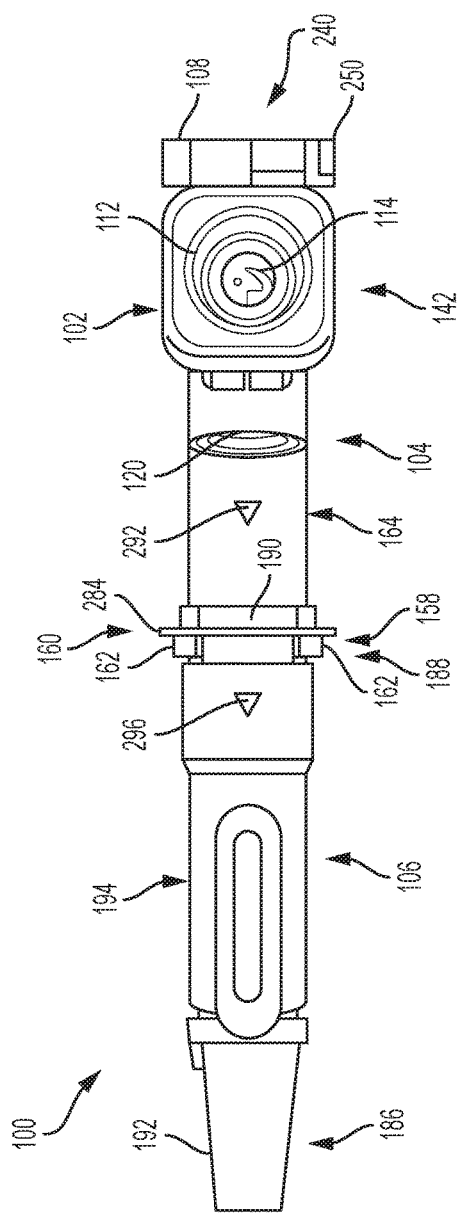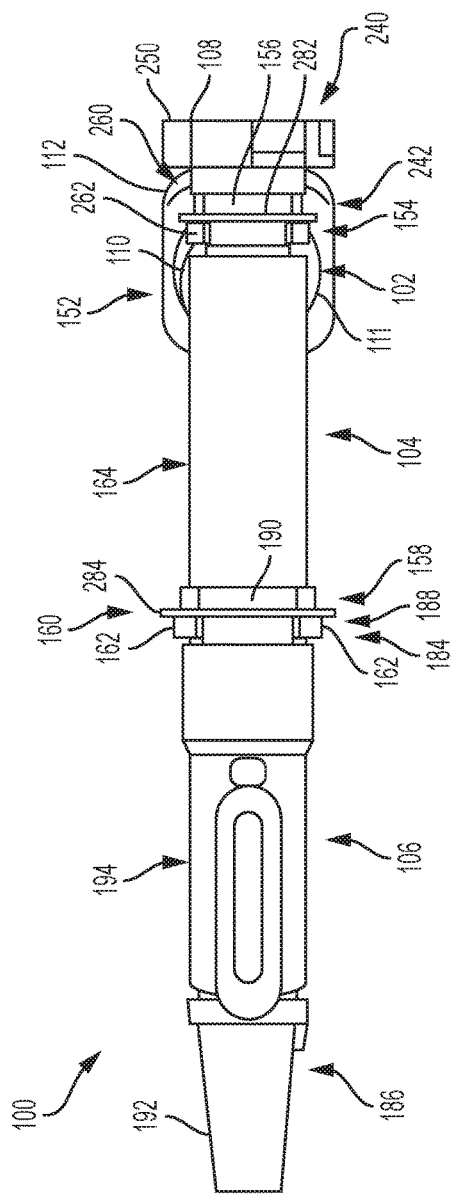

METHODS OF REMOVING A GLUTINOUS SUBSTANCE FROM AN APPLICATOR

CROSS-REFERENCE

This application is a divisional application of U.S. patent application Ser. No. 15/460,164, filed Mar. 15, 2017. The complete disclosure of the above-identified patent application is hereby incorporated by reference for all purposes.

TECHNICAL FIELD

The present disclosure relates to reusable applicators for glutinous substances and to associated methods.

BACKGROUND

Sealant applicators may lose functionality due to internal accumulation of solidified sealant. Production of replacement applicators increases costs and manufacturing lead time. Moreover, additional expenses may be incurred in conjunction with environmentally responsible disposal of dysfunctional applicators.

SUMMARY

Accordingly, apparatuses and methods, intended to address at least the above-identified concerns, would find utility.

The following is a non-exhaustive list of examples, which may or may not be claimed, of the subject matter according to the invention.

One example of the subject matter according to the invention relates to an applicator for delivering a glutinous substance. Applicator comprises a first body portion, comprising a base portion, an end-effector interface, extending from the base portion, and a side cover to be removably coupled to the base portion. A first cavity is formed in the first body portion when the side cover is removably coupled to the base portion. The first cavity is at least partially defined by the base portion, the side cover, and the end-effector interface. Applicator also comprises a second body portion, extending from the base portion of the first body portion. The second body portion is non-parallel to the first body portion. A second cavity extends through the second body portion and intersects the first cavity. Applicator further comprises a tip portion to be removably coupled to the second body portion. The tip portion comprises a nozzle portion and a third cavity that communicatively couples with the second cavity when the tip portion is removably coupled to the second body portion. The applicator additionally comprises an inner sleeve to be coaxially received inside the third cavity of the tip portion. The applicator also comprises an actuator interface, extending from the second body portion opposite the tip portion.

Use of removably coupled components (e.g. side cover 110 and base portion 111) as set forth above allows for disassembly, cleaning, and reassembly of applicator 100. First cavity 114, second cavity 168, and third cavity 220 form a continuous channel from end-effector interface 112 to nozzle portion 192 for glutinous substance 298 to flow through. Use of actuator interface 108 provides an option for further flow control by means of an actuator and plunger, described below. Tip portion 106 may be removed to uncover inner sleeve 210. This arrangement mechanically separates tapered second end 214 of inner sleeve 210 from tip portion 106. This permits the exposure of a plug of glutinous substance in nozzle portion 192 during disassembly by removing tip portion 106. Without the separation of tip portion 106 and inner sleeve 210, the internal narrowing would prevent removal of tip portion 106 due to the plug in nozzle portion 192.

Another example of the subject matter according to the invention relates to a method of assembling an applicator for delivering a glutinous substance. The method comprises attaching a side cover to a base portion of a first body portion of the applicator. An end-effector interface extends from the base portion at a first end of the first body portion. The applicator comprises a second body portion, extending from the base portion at a second end of the first body portion. A first cavity formed in the first body portion is at least partially defined by the base portion the end-effector interface and the side cover. The second body portion is non-parallel to the first body portion. A second cavity, extending through the second body portion, is in fluid communication with the first cavity of the first body portion. The method also comprises assembling a tip portion of the applicator by inserting an inner sleeve into the tip portion such that the inner sleeve is coaxial with the tip portion. A third cavity extends through the inner sleeve. The method additionally comprises coupling the tip portion to the second body portion such that the tip portion and the second body portion are coaxial and the third cavity of the inner sleeve is in fluid communication with the second cavity of the second body portion.

Assembling first cavity 114, second cavity 168, and third cavity 220 in fluid communication allows glutinous substance 298 to flow through applicator 100 from end-effector interface 112 through tip portion 106. In this manner, applicator 100 may deliver glutinous substance 298. The various components are also configured for ease of assembly and disassembly.

Yet another example of the subject matter according to the invention relates to a method for removing a glutinous substance from an applicator. The method comprises removing an actuator and a plunger, extending from the actuator, from the applicator before the glutinous substance has solidified. The method also comprises allowing the glutinous substance to solidify inside the applicator, such that the glutinous substance that has solidified comprises a first sealant plug, located inside a first body portion of the applicator, a second sealant plug, integral with the first sealant plug and located partially inside a second body portion of the applicator, and a third sealant plug, integral with the first sealant plug and located inside an end-effector interface, extending from a base portion of the first body portion. The method additionally comprises detaching a side cover from the base portion of the first body portion to expose the first sealant plug. The method further comprises severing the first sealant plug from the second sealant plug at a first junction between the first body portion and the second body portion. The method also comprises severing the first sealant plug from the third sealant plug at a second junction between the base portion of the first body portion and the end-effector interface. The method additionally comprises detaching a tip portion of the applicator from the second body portion to expose a portion of the second sealant plug. The method further comprises extracting the second sealant plug from the second body portion by pulling the portion of the second sealant plug, exposed by detaching the tip portion from the second body portion away from the second body portion in a direction along the second body portion. In addition, the method comprises separating the first sealant plug from the base portion of the first body portion. The method also comprises extracting the third sealant plug from the end-effector interface of the first body portion.

Allowing glutinous substance 298 to solidify prior to disassembly provides a manageably discrete set of sealant plugs that is cleaner and more straightforward to remove from applicator 100 than a non-hardened glutinous substance 298. Removing plunger 342 and actuator 340 prior to solidification of glutinous substance 298 allows portions of the sealant plug to be severed during removal steps. Use of removable components (e.g. side cover 110, and tip portion 106) allows access to the sealant plugs (i.e. first sealant plug 302, second sealant plug 304, and third sealant plug 300) at key geometries of applicator 100. Severing first sealant plug 302 from second sealant plug 304 allows second sealant plug 304 to be pulled from applicator 100 without being trapped against first junction 150. Similarly, severing first sealant plug 302 from third sealant plug 300 allows both first sealant plug 302 and third sealant plug 300 to be removed without being trapped against second junction 310.

BRIEF DESCRIPTION OF THE DRAWINGS

Figure 1:
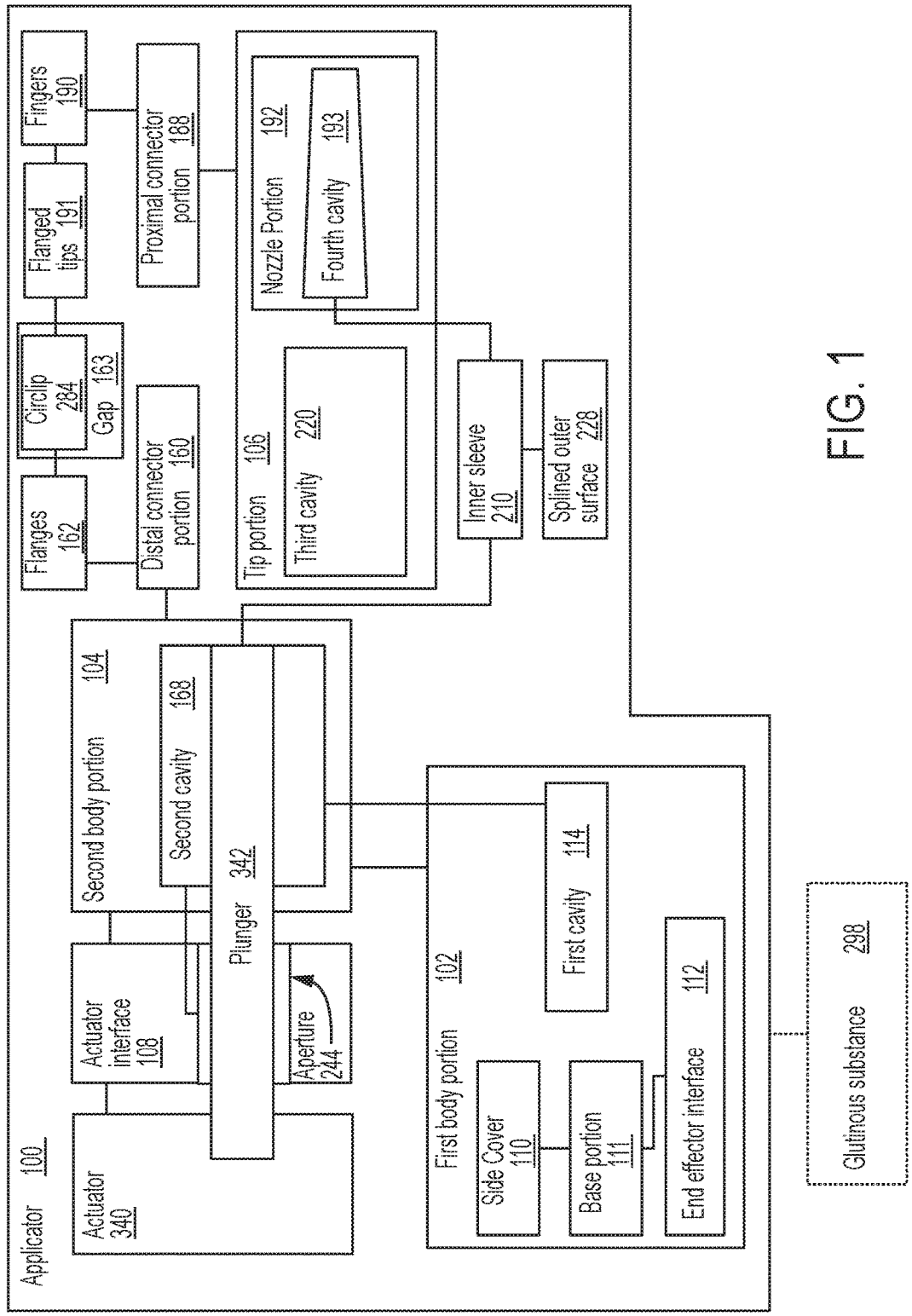
Figure 2:
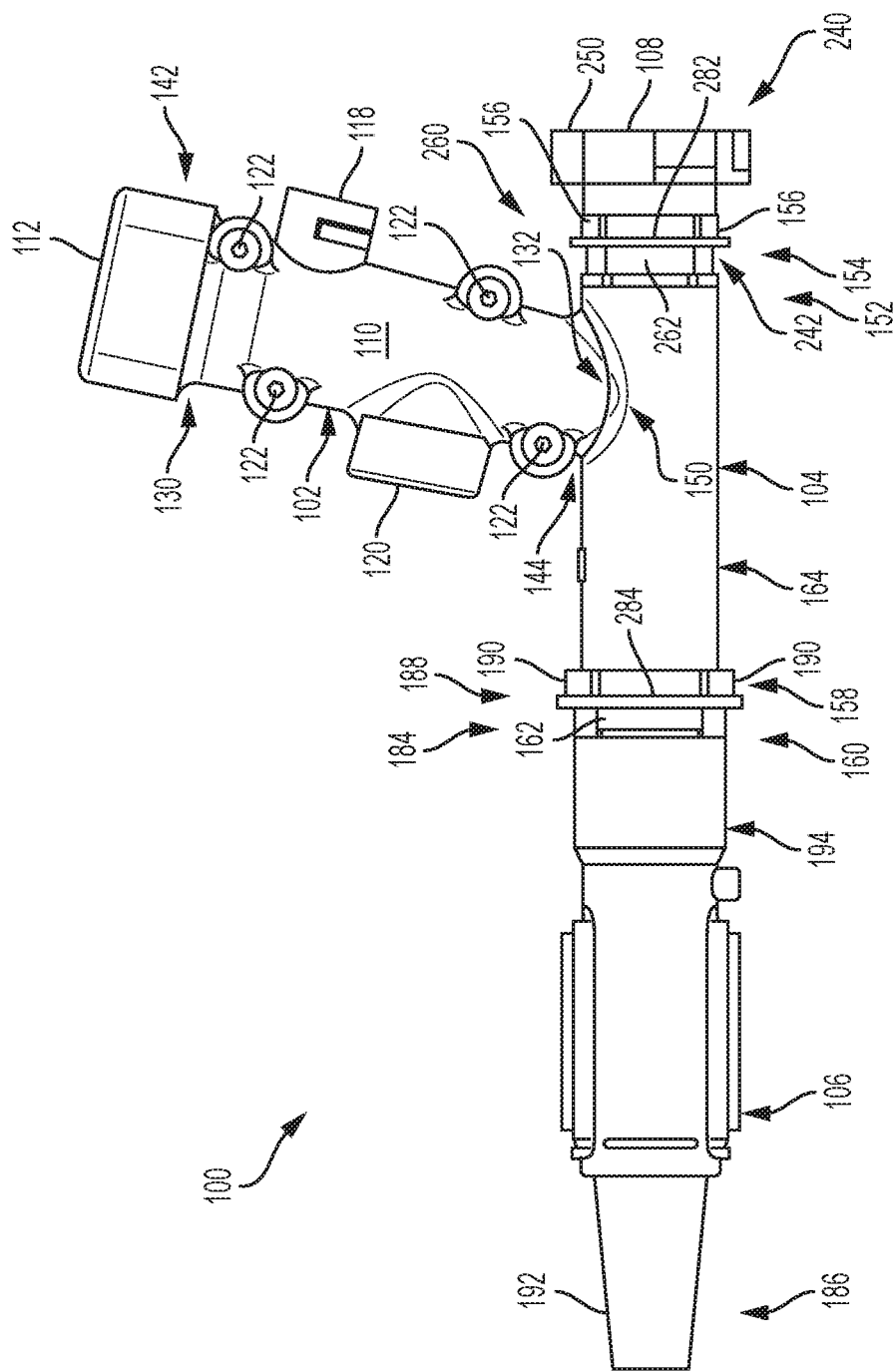
Figure 6:
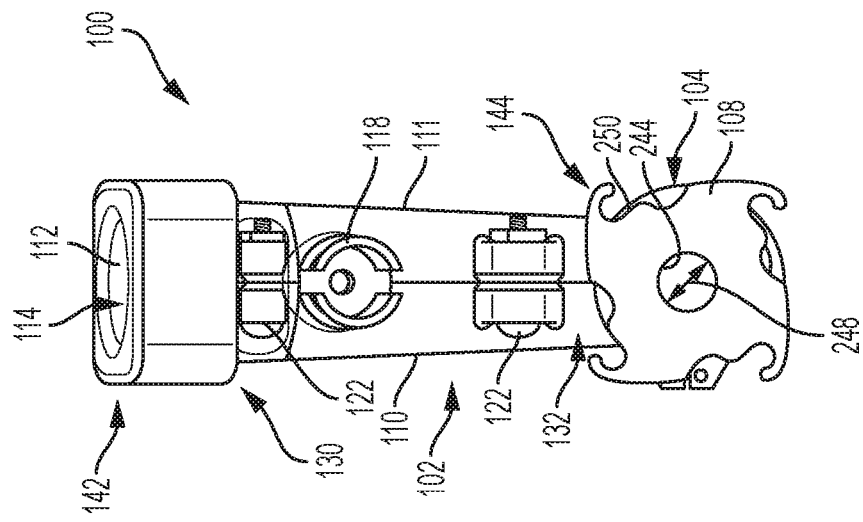
Figure 5:
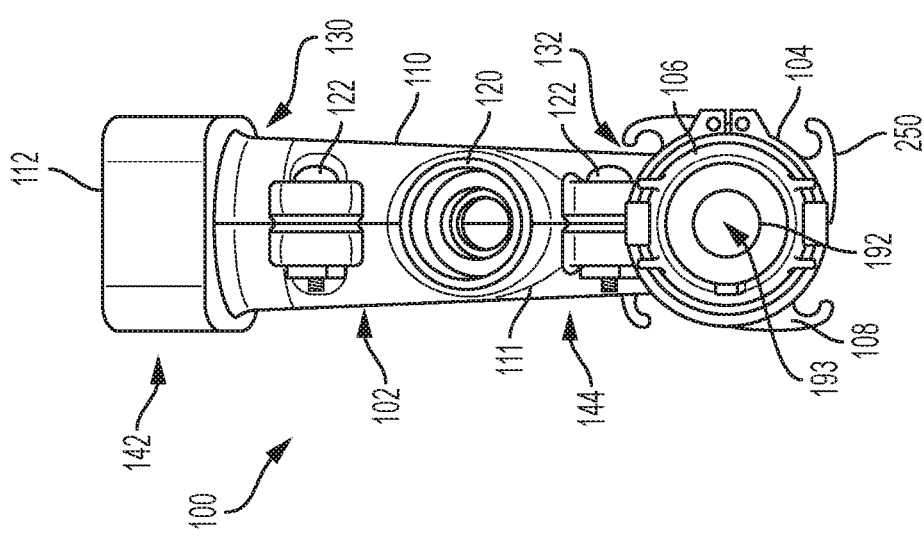
Figure 7:
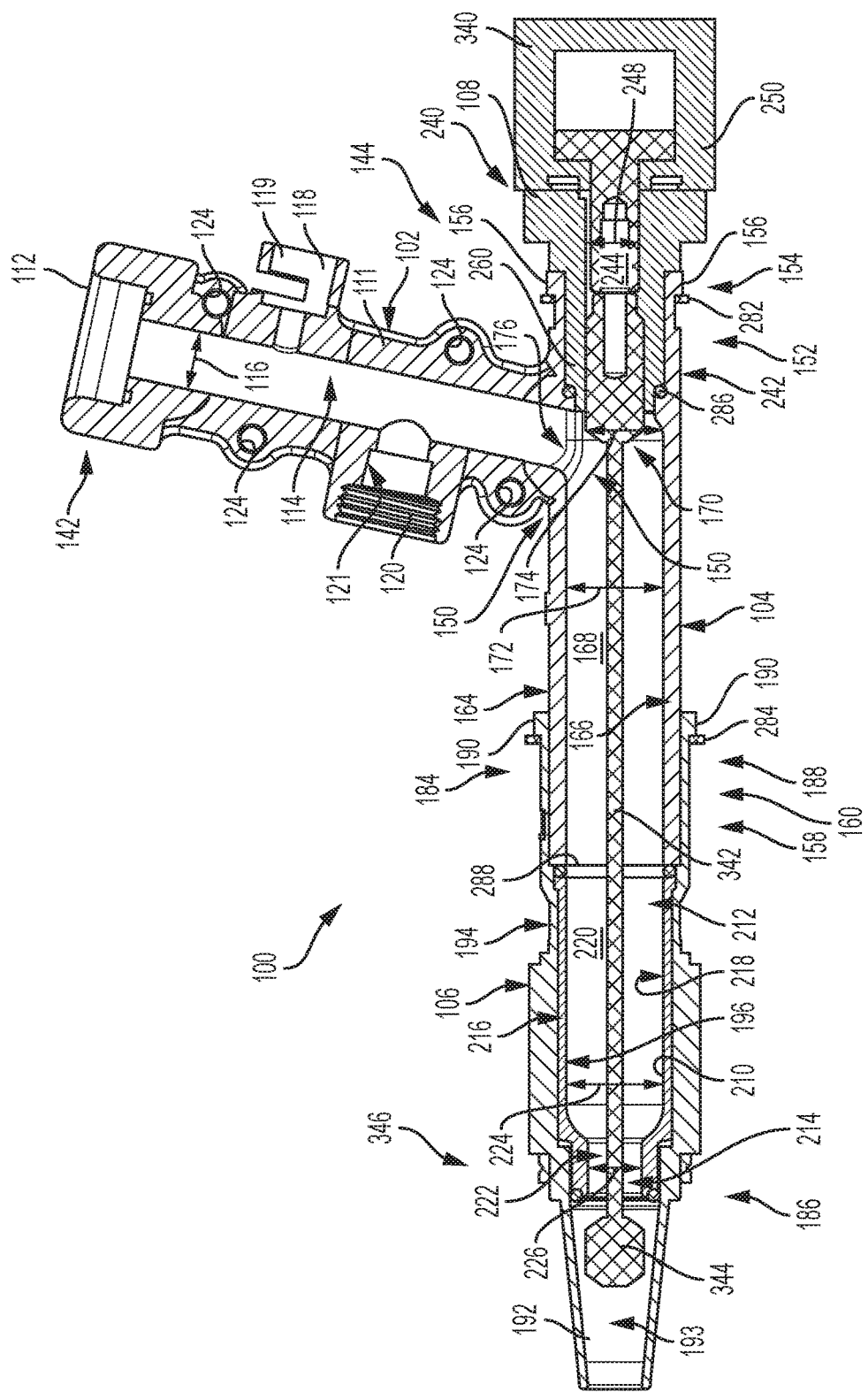
Figure 8:
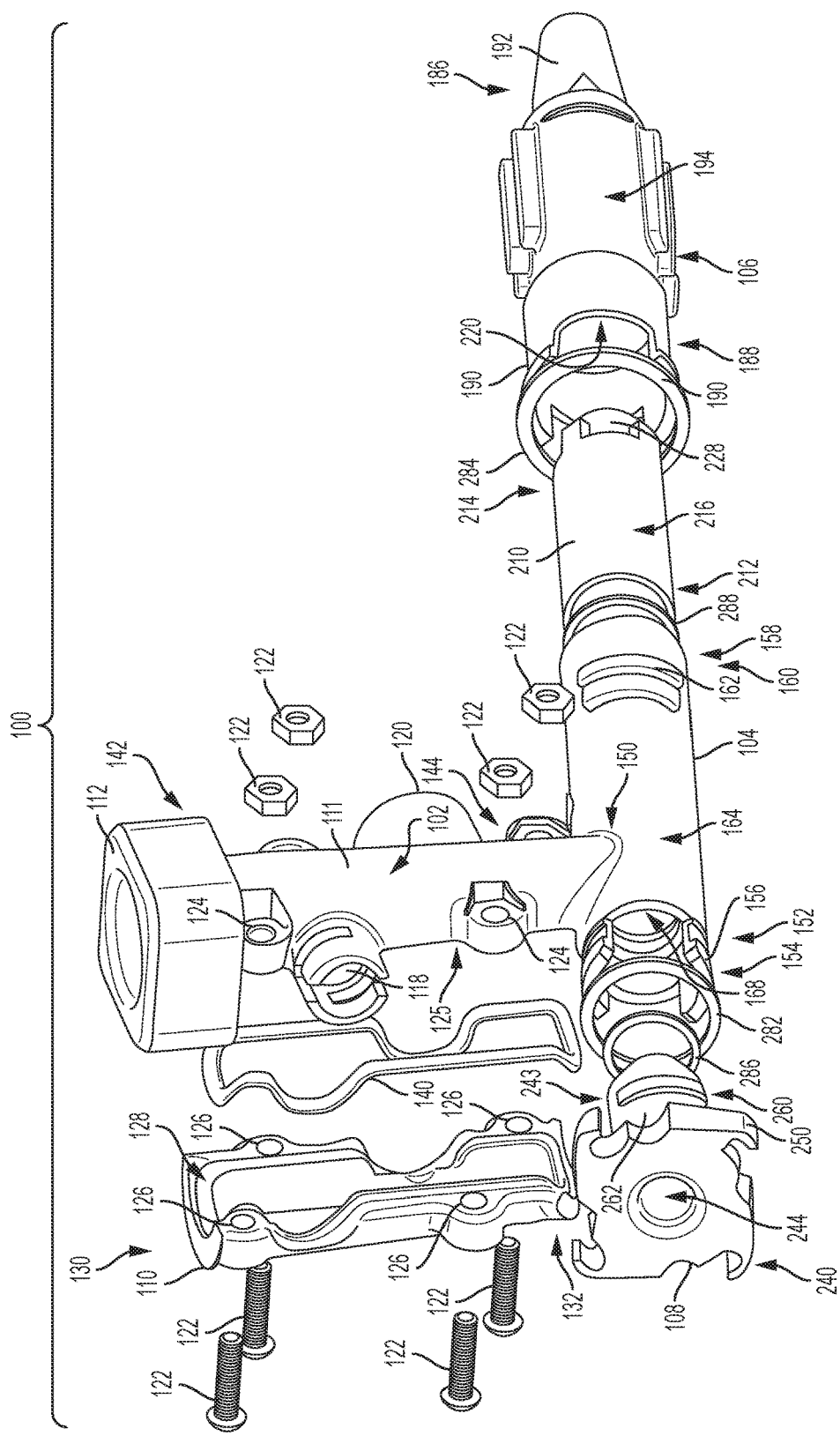
Figure 9:
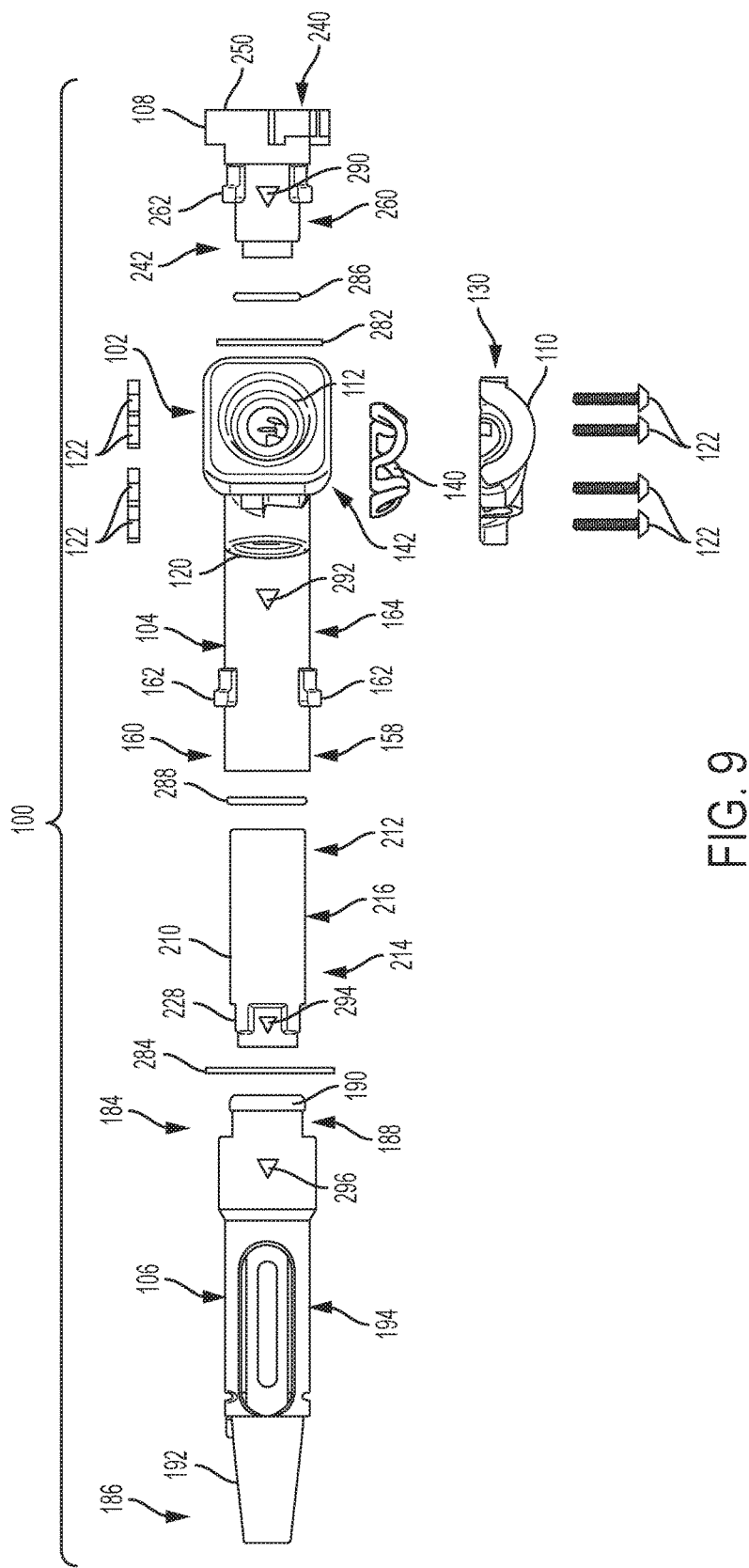
Figure 10:
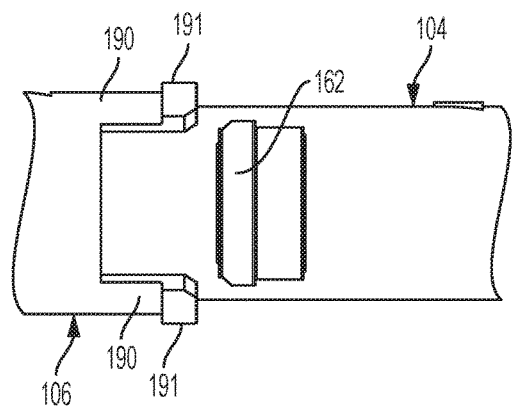
Figure 11:
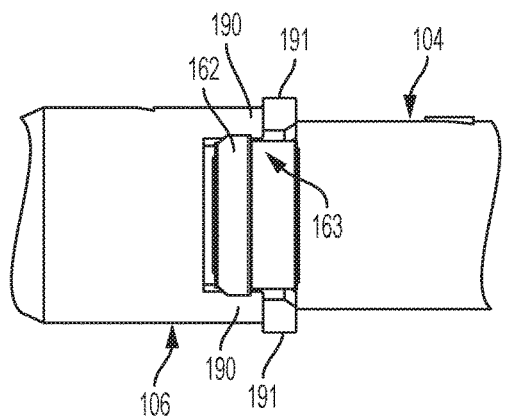
Figure 12:
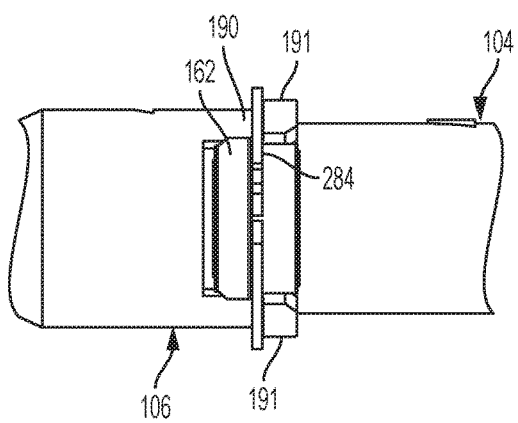
Figure 13:
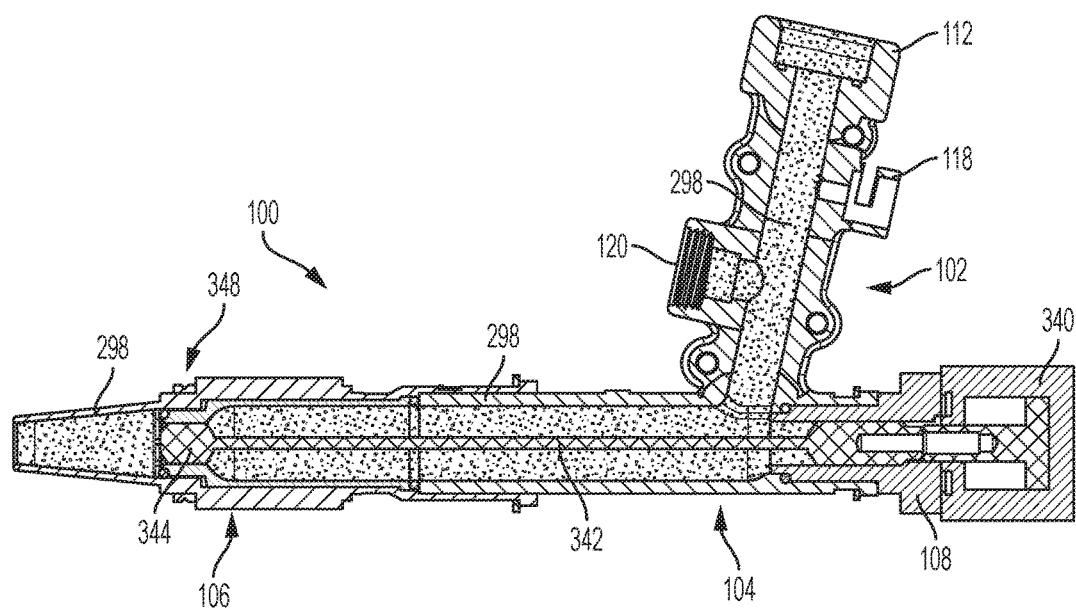
Figure 14:
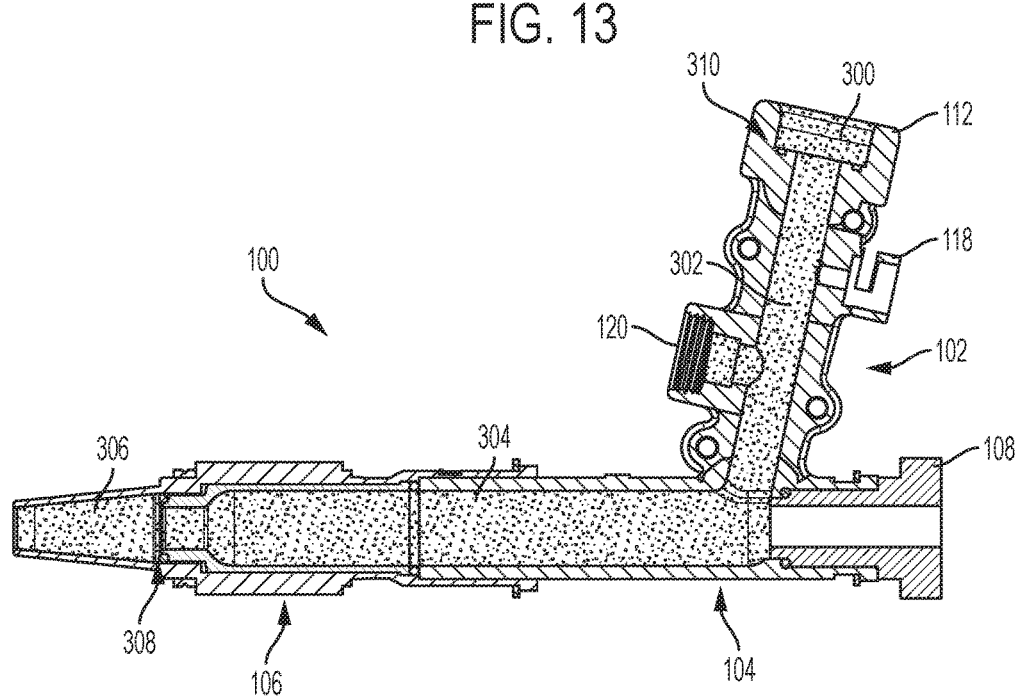
Figure 15:
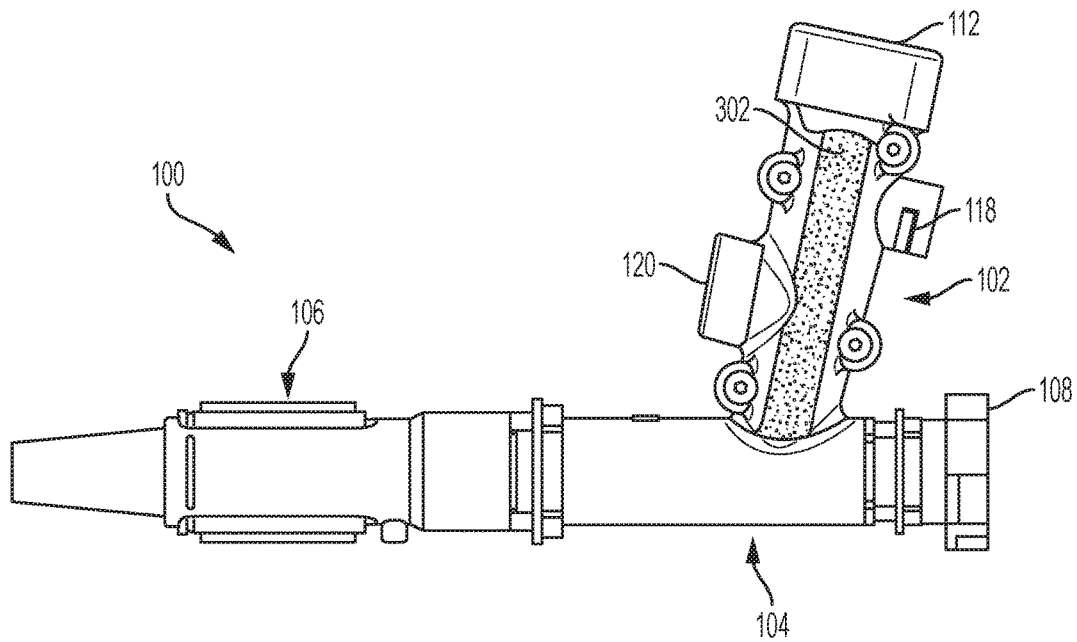
Figure 16:
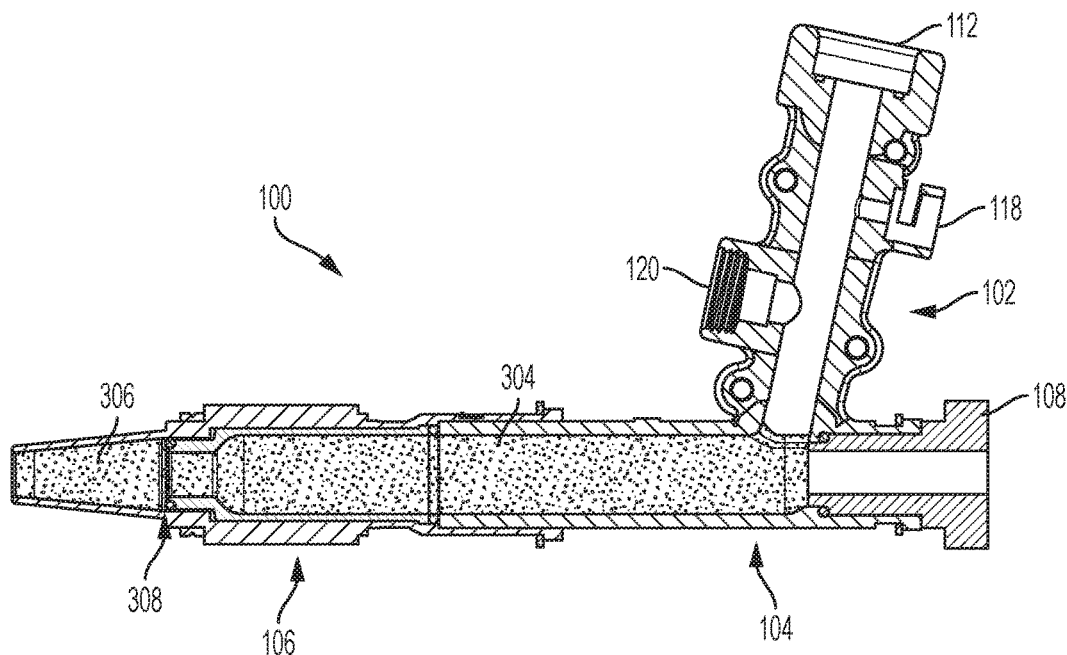
Figure 17:
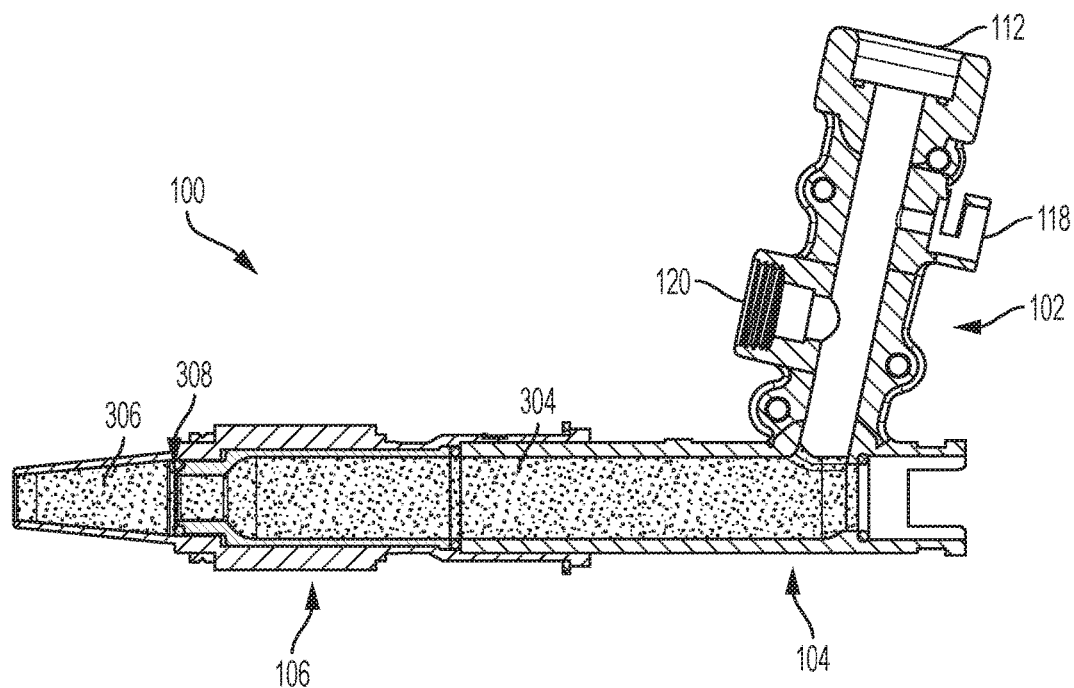
Figure 18:
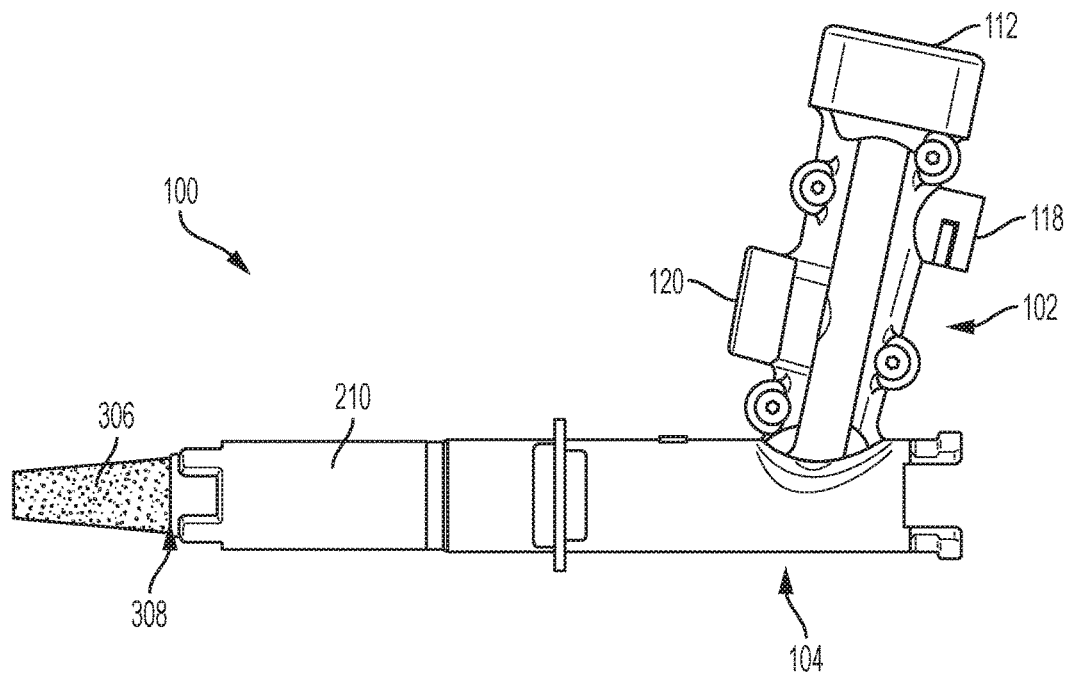
Figure 19:
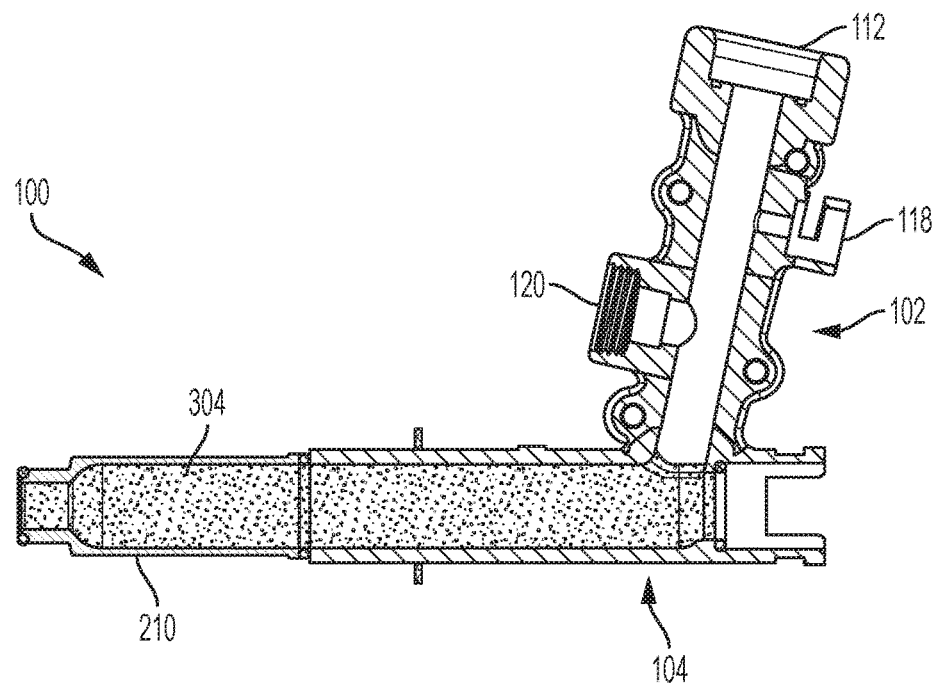
Figure 20:
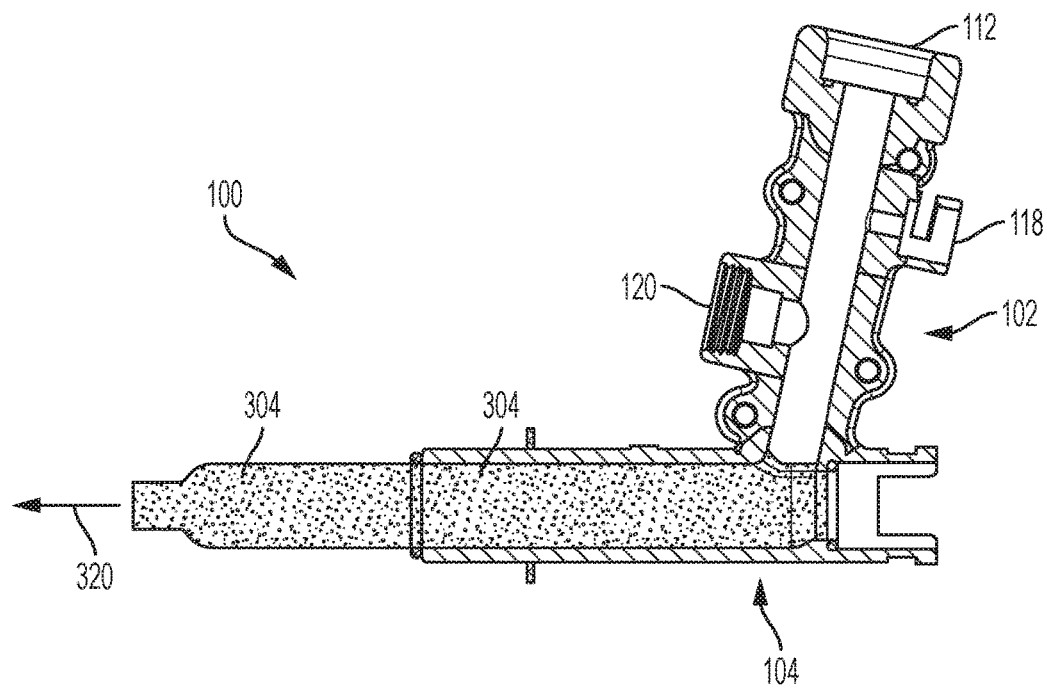
Figure 21:
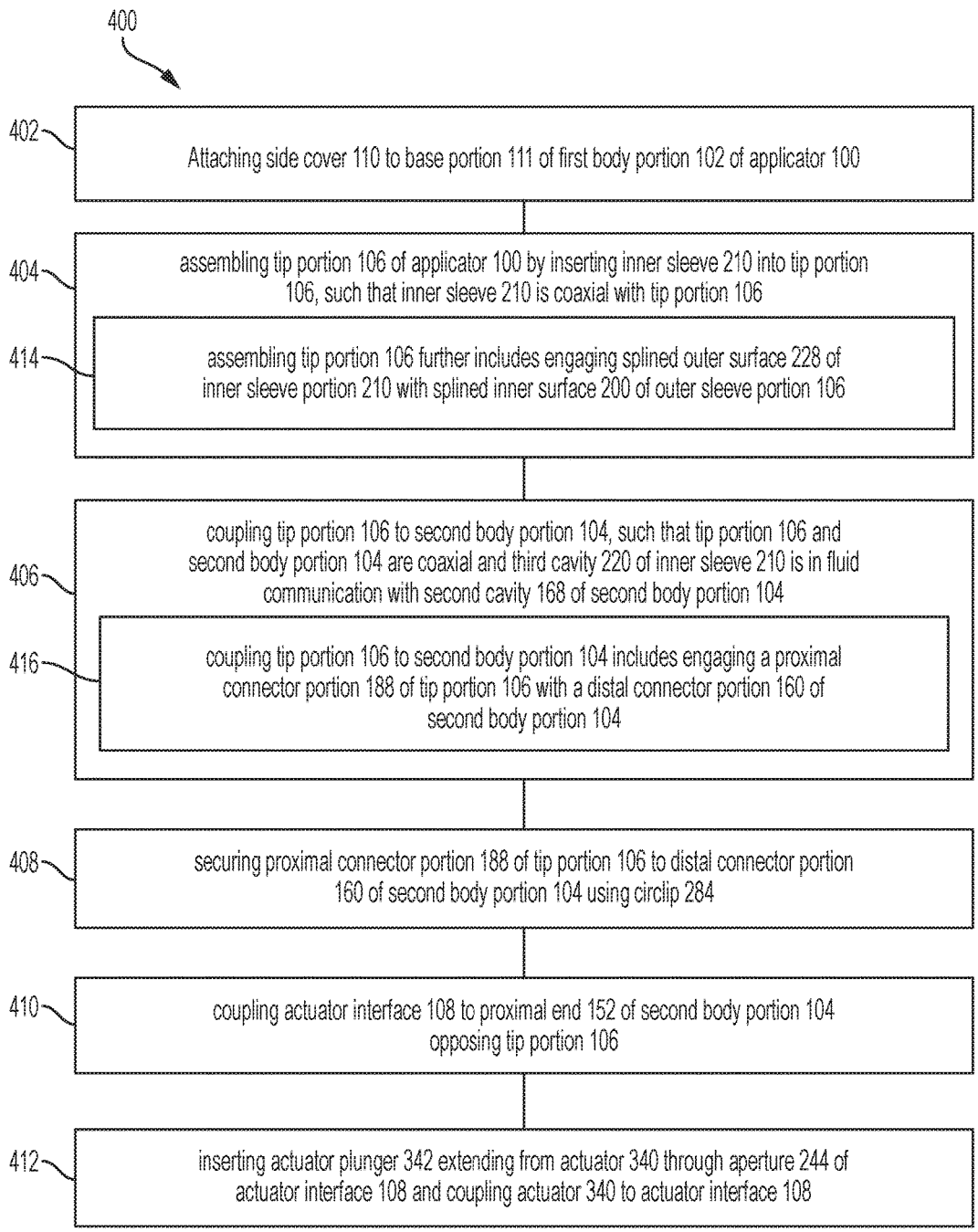
Figure 22A:
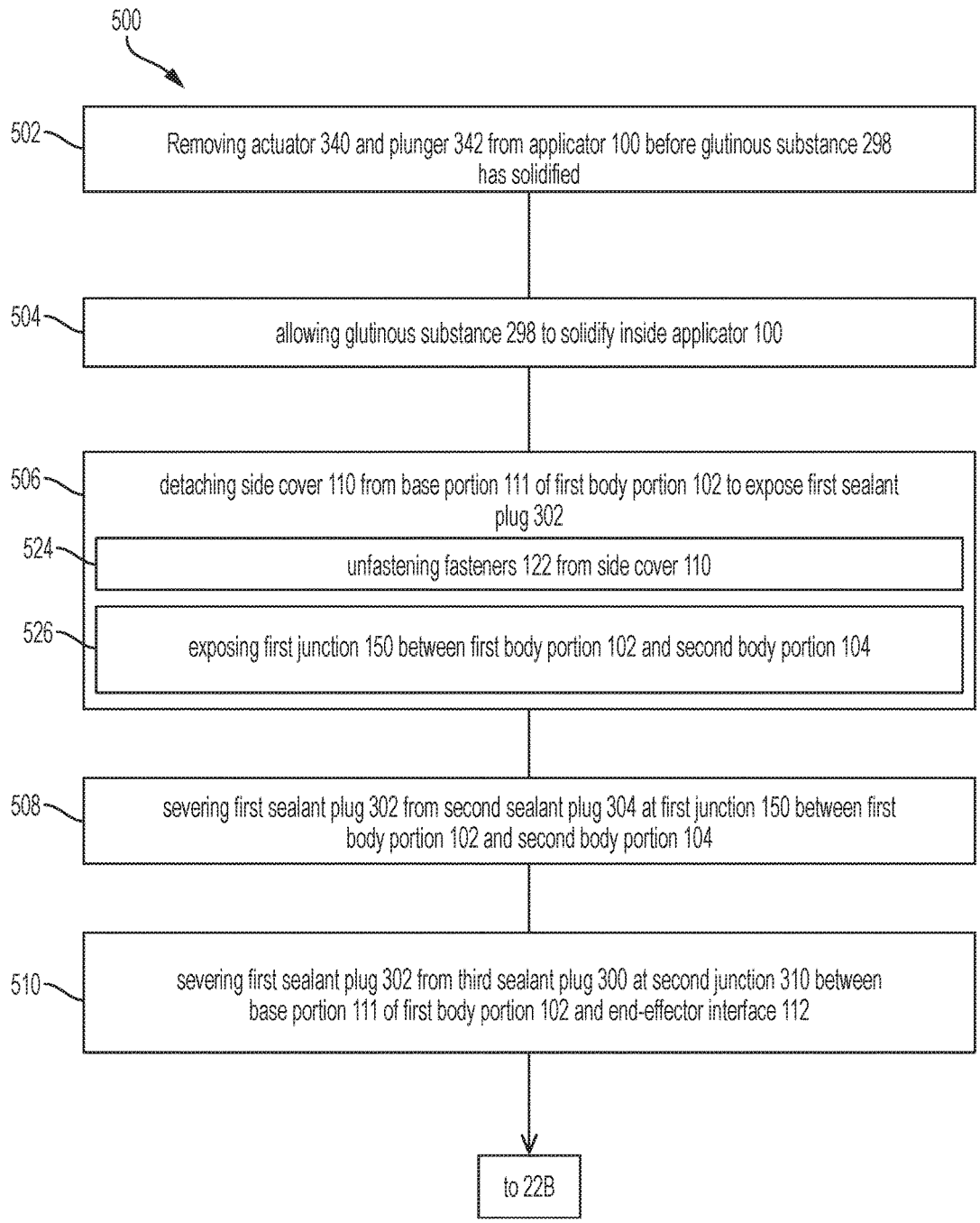
Figure 22B:
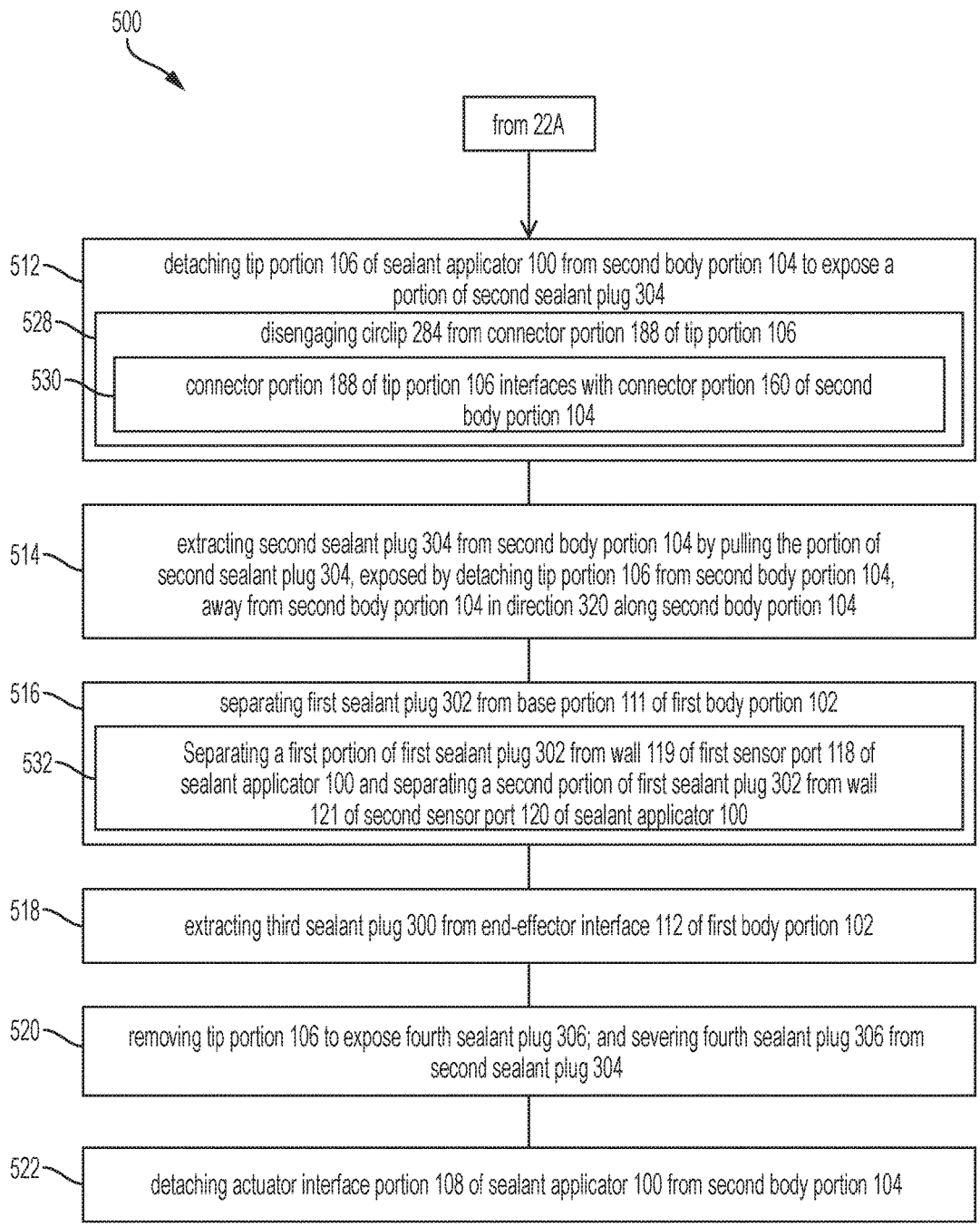
Figure 23:
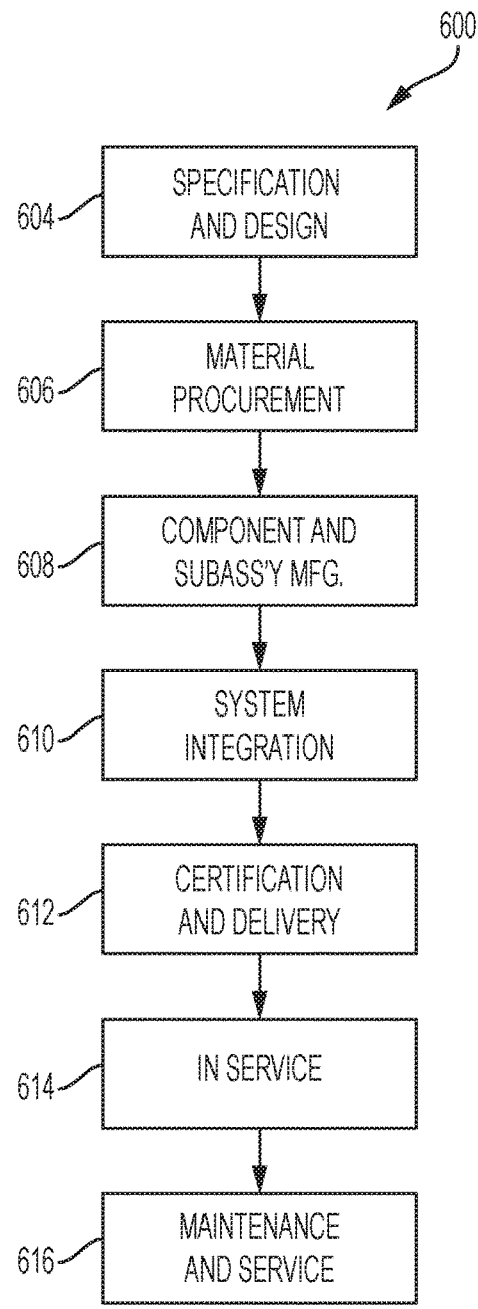

Having thus described one or more examples of the invention in general terms, reference will now be made to the accompanying drawings, which are not necessarily drawn to scale, and wherein like reference characters designate the same or similar parts throughout the several views, and wherein:

FIG. 1 is a block diagram of a reusable applicator, according to one or more examples of the present disclosure;

FIG. 2 is a schematic, side elevation view of the reusable applicator of FIG. 1, according to one or more examples of the present disclosure;

FIG. 3 is a schematic, bottom plan view of the reusable applicator of FIG. 2, according to one or more examples of the present disclosure;

FIG. 4 is a schematic, top plan view of the reusable applicator of FIG. 2, according to one or more examples of the present disclosure;

FIG. 5 is a schematic, front elevation view of the reusable applicator of FIG. 2, according to one or more examples of the present disclosure;

FIG. 6 is a schematic, rear elevation view of the reusable applicator of FIG. 2, according to one or more examples of the present disclosure;

FIG. 7 is a schematic, sectional side view of the reusable applicator of FIG. 2, according to one or more examples of the present disclosure;

FIG. 8 is a schematic, isometric, exploded view of the reusable applicator of FIG. 2, according to one or more examples of the present disclosure;

FIG. 9 is a schematic, bottom plan, exploded view of the reusable applicator of FIG. 2, according to one or more examples of the present disclosure;

FIG. 10 is a schematic, partial, detail view of a connection portion of the reusable applicator of FIG. 2, in a first configuration, according to one or more examples of the present disclosure;

FIG. 11 is a schematic, partial, detail view of the connection portion of FIG. 10, in a second configuration, according to one or more examples of the present disclosure;

FIG. 12 is a schematic, partial, detail view of the connection portion of FIG. 10, in a third configuration, according to one or more examples of the present disclosure;

FIG. 13 is a schematic, sectional side view of the reusable applicator of FIG. 2, including a glutinous substance in interior cavities, according to one or more examples of the present disclosure;

FIG. 14 is a schematic, sectional side view of the reusable applicator of FIG. 2, with an actuator and plunger portion removed, according to one or more examples of the present disclosure;

FIG. 15 is a schematic, side elevation view of the reusable applicator of FIG. 2, with an access door removed, according to one or more examples of the present disclosure;

FIG. 16 is a schematic, sectional side view of the reusable applicator of FIG. 15, with a portion of the glutinous substance removed, according to one or more examples of the present disclosure;

FIG. 17 is a schematic, sectional side view of the reusable applicator of FIG. 16, with an actuator interface removed, according to one or more examples of the present disclosure;

FIG. 18 is a schematic, side elevation view of the reusable applicator of FIG. 17, with an outer sleeve portion removed, according to one or more examples of the present disclosure;

FIG. 19 is a schematic, sectional side view of the reusable applicator of FIG. 18, with another portion of the glutinous substance removed, according to one or more examples of the present disclosure;

FIG. 20 is a schematic, sectional side view of the reusable applicator of FIG. 19, with a body portion removed, according to one or more examples of the present disclosure;

FIG. 21 is a block diagram of a method of assembling the reusable applicator of FIG. 1, according to one or more examples of the present disclosure;

FIGS. 22A and 22B collectively are a block diagram of a method of utilizing the reusable applicator of FIG. 1, according to one or more examples of the present disclosure;

FIG. 23 is a block diagram of aircraft production and service methodology; and

Figure 24:
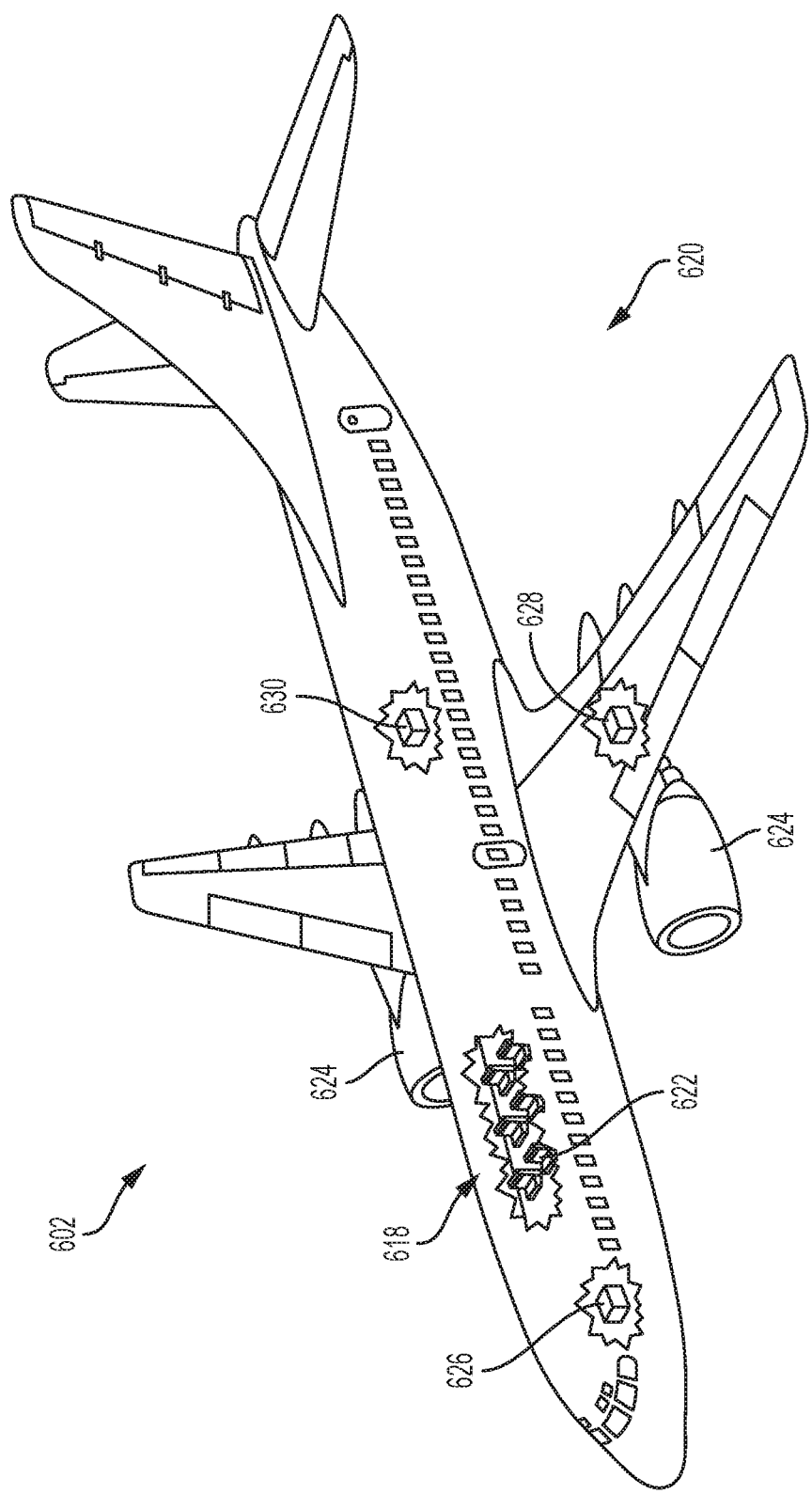

FIG. 24 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 21, 22A, and 22B, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 21, 22A, and 22B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIG. 1 and particularly to, e.g., FIGS. 2 through 9, applicator 100 for delivering glutinous substance 298 is disclosed. Applicator 100 comprises first body portion 102, comprising base portion 111, end-effector interface 112, extending from base portion 111, and side cover 110 to be removably coupled to base portion 111. First cavity 114 is formed in first body portion 102 when side cover 110 is removably coupled to base portion 111. First cavity 114 is at least partially defined by base portion 111, side cover 110, and end-effector interface 112. Applicator 100 also comprises second body portion 104, extending from base portion 111 of first body portion 102. Second body portion 104 is non-parallel to first body portion 102. Second cavity 168 extends through second body portion 104 and intersects first cavity 114. Applicator 100 also comprises tip portion 106 to be removably coupled to second body portion 104. Tip portion 106 comprises nozzle portion 192, and third cavity 220 that communicatively couples with second cavity 168 when tip portion 106 is removably coupled to second body portion 104. Applicator 100 also comprises inner sleeve 210 to be coaxially received inside third cavity 220 of tip portion 106. Applicator 100 also comprises actuator interface 108, extending from second body portion 104 opposite tip portion 106. The preceding subject matter of this paragraph characterizes example 1 of the present disclosure.

Use of removably coupled components (e.g. side cover 110 and base portion 111) as set forth above allows for disassembly, cleaning, and reassembly of applicator 100. First cavity 114, second cavity 168, and third cavity 220 form a continuous channel from end-effector interface 112 to nozzle portion 192 for glutinous substance 298 to flow through. Use of actuator interface 108 provides an option for further flow control by means of an actuator and plunger, described below. Tip portion 106 may be removed to uncover inner sleeve 210. This arrangement mechanically separates tapered second end 214 of inner sleeve 210 from tip portion 106. This permits the exposure of a plug of glutinous substance in nozzle portion 192 during disassembly by removing tip portion 106. Without the separation of tip portion 106 and inner sleeve 210, the internal narrowing would prevent removal of tip portion 106 due to the plug in nozzle portion 192.

Side cover 110 may include first end 130 and second end 132, and is configured to cover side opening 125 in base portion 111. Removing side cover 110 may provide access to a junction or intersection 176 between first cavity 113 and second cavity 168. First cavity 113 has inner diameter 116, e.g., a continuous inner diameter, defining a hollow passage for glutinous substance 298. Second body portion has outer surface 164 and inner surface 166. Inner surface 166 of second body portion 104 may comprise multiple inner diameters. In some examples, second cavity 168 has a narrowing portion 170 adjacent distal end 158, where second cavity 168 transitions from larger first diameter 172 to smaller second diameter 174. Tip portion 106 may have first end 184, second end 186, outer surface 194, and inner surface 196. Inner sleeve 210 may itself comprise first end 212, tapered second end 214, outer surface 216 generally facing inner surface 196 of tip portion 106, and inner surface 218. Actuator interface 108 also may have a first end 240 and a second end 242.

Referring generally to FIG. 1 and particularly to, e.g., FIG. 7, actuator 340 is coupled to actuator interface 108.

Actuator 340 comprises plunger 342. Plunger 342 extends from actuator 340 through second cavity 168. The preceding subject matter of this paragraph characterizes example 2 of the present disclosure, wherein example 2 also includes the subject matter according to example 1, above.

Glutinous substance 298 may be provided to applicator 100 via end-effector interface 112 at a selected pressure. Coupling actuator 340 to actuator interface 108 of applicator 100 allows control over the flow of glutinous substance 298 through applicator 100, e.g., by throttling. In some examples, actuator 340 may be actuated by a controllable mechanism, facilitating automatic control of the flow of glutinous substance 298.

Actuator 340 may be coupled to actuator interface 108 by any suitable releasably securable mechanism. For example, actuator 340 may be coupled to a twist-lock or bayonet-style connector 250 on first end 240 of actuator interface 108.

Referring generally to FIG. 1 and particularly to, e.g., FIG. 7, plunger 342 of actuator 340 further comprises head portion 344. Actuator 340 is operable to transition head portion 344 inside tip portion 106 between first position 346, with head portion 344 forward of inner sleeve 210 and inside nozzle portion 192, and second position 348, with head portion 344 at least partially within inner sleeve 210. The preceding subject matter of this paragraph characterizes example 3 of the present disclosure, wherein example 3 also includes the subject matter according to example 2, above.

Use of head portion 344 on plunger 342 allows actuator 340 to effectively turn on, turn off, and variably throttle a flow of glutinous substance 298. In first position 346, glutinous substance 298 can flow around head portion 344 and out of nozzle portion 192. In second position 348, head portion 344 blocks glutinous substance 298 from flowing out of inner sleeve 210. Transition of head portion 344 from first position 346 to second position 348 may encourage any portion of glutinous substance 298 present in nozzle portion 192 to return toward inner sleeve 210, functioning as a "snuff-back" mechanism to prevent unwanted outflow of glutinous substance 298.

Referring generally to FIG. 1 and particularly to, e.g., FIGS. 2 through 9, second body portion 104 is monolithic with base portion 111 of first body portion 102. The preceding subject matter of this paragraph characterizes example 4 of the present disclosure, wherein example 4 also includes the subject matter according to any one of examples 1 to 3, above.

Use of a single part for body portion 104 and base portion 111 provides structural support and rigidity to applicator 100, and retains body portion 104 and base portion 111 at a fixed angle. Monolithic construction simplifies the overall mechanism, requiring fewer connections and reducing manufacturing cost.

Referring generally to FIG. 1 and particularly to, e.g., FIGS. 2 through 9, nozzle portion 192 of tip portion 106 comprises fourth cavity 193, communicatively coupled with third cavity 220. At least a portion of fourth cavity 193 is tapered. The preceding subject matter of this paragraph characterizes example 5 of the present disclosure, wherein example 5 also includes the subject matter according to any one of examples 1 to 4, above.

Use of nozzle portion 192 allows for improved flow control of glutinous substance 298. A smaller exit diameter of nozzle portion 192 reduces pressure and increases exit flow velocity of glutinous substance 298. Fourth cavity 193 accommodates head portion 344 of plunger 342, allowing a transition of plunger 342 from first position 346 to second position 348 to facilitate the snuff-back effect described above.

Referring generally to FIG. 1 and particularly to, e.g., FIG. 7, inner sleeve 210 comprises first inner diameter 224 and second inner diameter 226. Second inner diameter 226 is smaller than first inner diameter 224. The preceding subject matter of this paragraph characterizes example 6 of the present disclosure, wherein example 6 also includes the subject matter according to any one of examples 1 to 5, above.

Use of smaller second inner diameter 226 provides a narrowed neck or constriction 222 for receiving head portion 344 of plunger 342 when in second position 348. Constriction 222 may be contoured and sized to receive head portion 344, allowing head portion 344 to block flow of glutinous substance 298.

Referring generally to FIG. 1 and particularly to, e.g., FIGS. 7 through 9, tip portion 106 and inner sleeve 210 are interlocked when inner sleeve is received inside third cavity 220 of tip portion 106, such that inner sleeve 210 is prevented from rotating with respect to tip portion 106. The preceding subject matter of this paragraph characterizes example 7 of the present disclosure, wherein example 7 also includes the subject matter according to any one of examples 1 to 6, above.

Preventing rotation of inner sleeve 210 with respect to tip portion 106 when interlocked helps to ensure proper assembly of applicator 100. Inner sleeve 210 can be removably locked to tip portion 106, with matching rotational orientations. A selectable number of orientations may be provided. For instance, in this example, one orientation is provided.

Referring generally to FIG. 1 and particularly to, e.g., FIGS. 7 through 9, inner sleeve 210 comprises splined outer surface 228. The preceding subject matter of this paragraph characterizes example 8 of the present disclosure, wherein example 8 also includes the subject matter according to example 7, above.

Use of a spline surface facilitates a reliable and convenient interlock, which simplifies assembly and reduces assembly errors.

Referring generally to FIG. 1 and particularly to, e.g., FIGS. 2 through 12, tip portion 106 comprises proximal connector portion 188. Second body portion 104 comprises distal connector portion 160. Tip portion 106 is to be removably coupled to second body portion 104 at least in part by engaging proximal connector portion 188 of tip portion 106 with distal connector portion 160 of second body portion 104 so that tip portion 106 is rotationally fixed relative to second body portion 104. The preceding subject matter of this paragraph characterizes example 9 of the present disclosure, wherein example 9 also includes the subject matter according to any one of examples 1 to 8, above.

Engaging proximal connector portion 188 with distal connector portion 160 provides a reliable, convenient, and secure connection between first end 184 of tip portion 106 and distal end 158 of second body portion 104.

Referring generally to FIG. 1 and particularly to, e.g., FIGS. 2 through 12, proximal connector portion 188 of tip portion 106 comprises pair of opposing fingers 190, having respective flanged tips 191. The preceding subject matter of this paragraph characterizes example 10 of the present disclosure, wherein example 10 also includes the subject matter according to example 9, above.

Use of opposing fingers 190 facilitates connection with a connector on second body portion 104, for example opposing flanges as described below. Interlocked fingers and flanges also provide a seating surface for a circlip.

Referring generally to FIGS. 1 through 12 and particularly to, e.g., FIGS. 10 through 12, distal connector portion 160 of second body portion 104 comprises pair of opposing flanges 162. The preceding subject matter of this paragraph characterizes example 11 of the present disclosure, wherein example 11 also includes the subject matter according to example 10, above.

Use of opposing flanges 162 allows distal connector portion 160 at distal end 158 of second body portion 104 to interlock with opposing fingers 190 of proximal connector portion 188, to facilitate a secure connection between second body portion 104 and tip portion 106, and provide a seating surface for a circlip.

Referring generally to FIGS. 1 through 12 and particularly to, e.g., FIGS. 10 through 12, pair of opposing fingers 190 of proximal connector portion 188 of tip portion 106 are configured to interlock with pair of opposing flanges 162 of distal connector portion 160 of second body portion 104 so that gap 163 is formed between respective flanged tips 191 of pair of opposing fingers 190 of proximal connector portion 188 and pair of opposing flanges 162 of distal connector portion 160. First circlip 284 is to be received into gap 163 to secure tip portion 106 to second body portion 104 to prevent tip portion 106 from translating relative to second body portion 104. The preceding subject matter of this paragraph characterizes example 12 of the present disclosure, wherein example 12 also includes the subject matter according to example 11, above.

Use of opposing fingers 190 that are interlocked and opposing flanges 162 with a circlip provides a removable connection for coupling tip portion 106 and second body portion 104 that is secure, repeatable, and reliable. A simple connector and clip connection is convenient and cost-effective.

Referring generally to FIG. 1 and particularly to, e.g., FIGS. 2 through 9, actuator interface 108 is monolithic with second body portion 104. The preceding subject matter of this paragraph characterizes example 13 of the present disclosure, wherein example 13 also includes the subject matter according to any one of examples 1 to 12, above.

Use of actuator interface 108 that is monolithic with second body portion 104 may simplify construction and reduce manufacturing costs of applicator 100.

Referring generally to FIG. 1 and particularly to, e.g., FIGS. 2 through 9, actuator interface 108 is detachable from second body portion 104. The preceding subject matter of this paragraph characterizes example 14 of the present disclosure, wherein example 14 also includes the subject matter according to any one of examples 1 to 12, above.

Use of actuator interface 108 that is detachable facilitates disassembly of applicator 100 for cleaning.

Referring generally to FIG. 1 and particularly to, e.g., FIGS. 2 through 9, actuator interface 108 comprises interface connector portion 260, interlockable with proximal connector portion 154 of second body portion 104. Second circlip 282 is to secure actuator interface 108 to second body portion 104 to prevent actuator interface 108 from translating relative to second body portion 104. The preceding subject matter of this paragraph characterizes example 15 of the present disclosure, wherein example 15 also includes the subject matter according to example 14, above.

Engaging interface connector portion 260 with proximal connector portion 154 provides a reliable, convenient, and secure connection between proximal end 152 of second body portion 104 and second end 242 of actuator interface 108.

Proximal connector portion 154 and interface connector portion 260 may include any suitable releasably securable connection mechanism. For example, proximal connector portion 154 may comprise a pair of opposing fingers 156 configured to interlock with a corresponding pair of opposing flanges or projections 262, in similar fashion to the interlocking mechanism, shown in FIGS. 10-12. Second circlip 282 may secure fingers 156 to projections 262.

Referring generally to FIG. 1 and particularly to, e.g., FIGS. 6 through 8, actuator interface 108 comprises aperture 244, passing therethrough. Aperture 244 is communicatively coupled with second cavity 168 when actuator interface 108 is removably coupled to second body portion 104. The preceding subject matter of this paragraph characterizes example 16 of the present disclosure, wherein example 16 also includes the subject matter according to example 14 or 15, above.

Aperture 244 allows plunger 342 to extend into second cavity 168 and acts as a guide to align plunger 342 with a central axis of second body portion 104 and tip portion 106.

Plunger 342 may extend from actuator 340 through aperture 244, which has inner diameter 248 configured to allow passage of a shaft or rod of plunger 342.

Referring generally to FIG. 1 and particularly to, e.g., FIGS. 2 through 9, applicator 100 also comprises first sensor port 118, formed in first body portion 102. The preceding subject matter of this paragraph characterizes example 17 of the present disclosure, wherein example 17 also includes the subject matter according to any one of examples 1 to 16, above.

Use of first sensor port 118 allows a first sensor to be removably coupled to applicator 100, for sensing pressure, flow rate, and the like.

Referring generally to FIG. 1 and particularly to, e.g., FIGS. 2 through 9, first sensor port 118 is formed in base portion 111 of first body portion 102. The preceding subject matter of this paragraph characterizes example 18 of the present disclosure, wherein example 18 also includes the subject matter according to example 17, above.

Forming first sensor port 118 in base portion 111 facilitates a seamless sensor port and simplifies the design of side cover 110.

Referring generally to FIG. 1 and particularly to, e.g., FIGS. 2 through 9, applicator 100 also comprises second sensor port 120, formed in first body portion 102. The preceding subject matter of this paragraph characterizes example 19 of the present disclosure, wherein example 19 also includes the subject matter according to example 17 or 18, above.

Use of second sensor port 120 allows a second sensor to be removably coupled to applicator 100, for sensing pressure, flow rate, and the like.

Referring generally to FIG. 1 and particularly to, e.g., FIGS. 2 through 9, second sensor port 120 is formed in base portion 111 of first body portion 102. The preceding subject matter of this paragraph characterizes example 20 of the present disclosure, wherein example 20 also includes the subject matter according to example 19, above.

Forming second sensor port 120 in base portion 111 facilitates a seamless sensor port and simplifies the design of side cover 110.

Referring generally to FIG. 1 and particularly to, e.g., FIGS. 2 through 9, first sensor port 118 is formed opposite second sensor port 120. The preceding subject matter of this paragraph characterizes example 21 of the present disclosure, wherein example 21 also includes the subject matter according to example 19 or 20, above.

Use of opposed sensor ports allows a first sensor and a second sensor to independently sense characteristics of a flow of glutinous substance 298 through first body portion 102. Such placement prevents interference between the first sensor and the second sensor, and also interference between cables associated with the sensors.

Referring generally to FIG. 1 and particularly to, e.g., FIG. 8, applicator 100 also comprises seal 140. Seal 140 is positionable between side cover 110 and base portion 111, wherein seal 140 is positionable between two three-dimensional surfaces. The preceding subject matter of this paragraph characterizes example 22 of the present disclosure, wherein example 22 also includes the subject matter according to any one of examples 1 to 21, above.

Use of seal 140 prevents leakage of glutinous substance 298 from an interface between side cover 110 and base portion 111. The ability to conform to a three dimensional shape allows seal 140 to conform to a contour of the interface, and thereby prevent kinks or leakage that might result from folding as seal 140 follows the interface.

Seal 140 may include any suitable gasket or other sealing member, and may include a flexible and/or resilient band. Seal 140 may be positionable between a contoured or three-dimensional surface 128 of side cover 110 and a corresponding surface of base portion 111.

Referring generally to FIG. 1 and particularly to, e.g., FIGS. 7 through 9, applicator 100 also comprises first annular seal 288, positionable between second body portion 104 and tip portion 106. First annular seal 288 is positionable between a first two two-dimensional surfaces. The preceding subject matter of this paragraph characterizes example 23 of the present disclosure, wherein example 23 also includes the subject matter according to any one of examples 1 to 22, above.

Use of first annular seal 288 allows a connection between second body portion 104 and tip portion 106 to be sealed.

First annular seal 288 may include any suitable annular sealing mechanism, such as an o-ring or gasket.

Referring generally to FIG. 1 and particularly to, e.g., FIGS. 7 through 9, applicator 100 also comprises second annular seal 286, positionable between second body portion 104 and actuator interface 108, wherein second annular seal 286 is positionable between a second two two-dimensional surfaces. The preceding subject matter of this paragraph characterizes example 24 of the present disclosure, wherein example 24 also includes the subject matter according to any one of examples 1 to 23, above.

Use of second annular seal 286 allows a connection between second body portion 104 and actuator interface 108 to be sealed.

Second annular seal 286 may include any suitable annular sealing mechanism, such as an o-ring or gasket.

Referring generally, e.g., to FIGS. 1-12 and particularly to FIG. 21, method 400 of assembling applicator 100 for delivering glutinous substance 298 is disclosed. Method 400 comprises (block 402) attaching side cover 110 to base portion 111 of first body portion 102 of applicator 100. End-effector interface 112 extends from base portion 111 at first end 142 of first body portion 102. Applicator 100 comprises second body portion 104, extending from base portion 111 at second end 144 of first body portion 102. First cavity 114, formed in first body portion 102, is at least partially defined by base portion 111, end-effector interface 112, and side cover 110. Second body portion 104 is non-parallel to first body portion 102. Second cavity 168, extending through second body portion 104, is in fluid communication with first cavity 114 of first body portion 102. Method 400 additionally comprises (block 404) assembling tip portion 106 of applicator 100 by inserting inner sleeve 210 into tip portion 106, such that inner sleeve 210 is coaxial with tip portion 106. Third cavity 220 extends through inner sleeve 210. Method 400 also comprises (block 406) coupling tip portion 106 to second body portion 104, such that tip portion 106 and second body portion 104 are coaxial and third cavity 220 of inner sleeve 210 is in fluid communication with second cavity 168 of second body portion 104. The preceding subject matter of this paragraph characterizes example 25 of the present disclosure.

Assembling first cavity 114, second cavity 168, and third cavity 220 in fluid communication allows glutinous substance 298 to flow through applicator 100 from end-effector interface 112 through tip portion 106. In this manner, applicator 100 may deliver glutinous substance 298. The various components are also configured for ease of assembly and disassembly.

Guiding indicia on various components of applicator 100 may be used to carry out or align portions of the applicator when carrying out steps of method 400, including further steps described below. For example, small triangles or arrow-like indicia may be present on different components to show where neighboring components align radially. For example, as depicted in FIG. 9, triangle 290 on actuator interface 108, triangle 292 on second body portion 104, triangle 294 on inner sleeve 210, and triangle 296 on tip portion 106 are all meant to align when applicator 100 is properly assembled.

Referring generally, e.g., to FIGS. 1-12 and particularly to FIG. 21, method 400 further comprises (block 410) coupling actuator interface 108 to proximal end 152 of second body portion 104, opposing tip portion 106. Actuator interface 108 comprises aperture 244 to receive plunger 342, extending from actuator 340. The preceding subject matter of this paragraph characterizes example 26 of the present disclosure, wherein example 26 also includes the subject matter according to example 25, above.

Use of actuator interface 108 allows an actuator to be connected to applicator 100, and provides a guide to align actuator plunger 342 with a central axis of second body portion 104 and tip portion 106.

Referring generally, e.g., to FIG. 7 and particularly to FIG. 21, method 400 further comprises (block 412) inserting plunger 342, extending from actuator 340, through aperture 244 of actuator interface 108 and coupling actuator 340 to actuator interface 108. Plunger 342 extends through second cavity 168. The preceding subject matter of this paragraph characterizes example 27 of the present disclosure, wherein example 27 also includes the subject matter according example 26, above.

Use of plunger 342 allows control over flow of glutinous substance 298 through applicator 100. For example, actuator 340 may provide automatic control of plunger 342 and thereby automatic control of the flow of glutinous substance 298.

Referring generally, e.g., to FIGS. 7 through 9 and particularly to FIG. 21, according to method 400, assembling tip portion 106 further comprises (block 414) engaging splined outer surface 228 of inner sleeve 210 with splined inner surface 200 of tip portion 106. The preceding subject matter of this paragraph characterizes example 28 of the present disclosure, wherein example 28 also includes the subject matter according to any one of examples 25 to 27, above.

Use of splined outer surface 228 and splined inner surface 200 prevents rotation of inner sleeve 210 with respect to tip portion 106, and facilitates reliable and secure assembly.

Referring generally, e.g., to FIGS. 1-12 and particularly to FIG. 21, according to method 400, coupling tip portion 106 to second body portion 104 comprises (block 416) engaging proximal connector portion 188 of tip portion 106 with distal connector portion 160 of second body portion 104. The preceding subject matter of this paragraph characterizes example 29 of the present disclosure, wherein example 29 also includes the subject matter according to any one of examples 25 to 28, above.

Use of proximal connector portion 188 and distal connector portion 160 provides a reliable, convenient, and secure connection between tip portion 106 and second body portion 104.

Referring generally, e.g., to FIGS. 1-12 and particularly to FIG. 21, method 400 further comprises (block 408) securing proximal connector portion 188 of tip portion 106 to distal connector portion 160 of second body portion 104 using first circlip 284. The preceding subject matter of this paragraph characterizes example 30 of the present disclosure, wherein example 30 also includes the subject matter according to example 29.

Use of first circlip 284 provides a removable connection for coupling tip portion 106 and second body portion 104 that is secure, repeatable, and reliable. A simple connector and clip connection may be convenient and cost-effective.

Referring generally to FIGS. 22A-22B and particularly to, e.g., FIGS. 13 through 20, method 500 for removing glutinous substance 298 from applicator 100 is disclosed. Method 500 comprises (block 502) removing actuator 340 and plunger 342, extending from actuator 340, from applicator 100 before glutinous substance 298 has solidified. Method 500 also comprises (block 504) allowing glutinous substance 298 to solidify inside applicator 100, such that glutinous substance 298 that has solidified comprises first sealant plug 302, located inside first body portion 102 of applicator 100, second sealant plug 304, integral with first sealant plug 302 and located partially inside second body portion 104 of applicator 100, and third sealant plug 300, integral with first sealant plug 302 and located inside end-effector interface 112, extending from base portion 111 of first body portion 102. Method 500 additionally comprises (block 506) detaching side cover 110 from base portion 111 of first body portion 102 to expose first sealant plug 302. Method 500 further comprises (block 508) severing first sealant plug 302 from second sealant plug 304 at first junction 150 between first body portion 102 and second body portion 104. Method 500 also comprises (block 510) severing first sealant plug 302 from third sealant plug 300 at second junction 310 between base portion 111 of first body portion 102 and end-effector interface 112. Method 500 additionally comprises (block 512) detaching tip portion 106 of applicator 100 from second body portion 104 to expose a portion of second sealant plug 304. Method 500 further comprises (block 514) extracting second sealant plug 304 from second body portion 104 by pulling the portion of second sealant plug 304, exposed by detaching tip portion 106 from second body portion 104 away from second body portion 104 in direction 320 along second body portion 104. Method 500 also comprises (block 516) separating first sealant plug 302 from base portion 111 of first body portion 102. Method 500 further comprises (block 518) extracting third sealant plug 300 from end-effector interface 112 of first body portion 102. The preceding subject matter of this paragraph characterizes example 31 of the present disclosure.

Allowing glutinous substance 298 to solidify prior to disassembly provides a manageably discrete set of sealant plugs that is cleaner and more straightforward to remove from applicator 100 than glutinous substance 298 that has not solidified. Removing plunger 342 and actuator 340 prior to solidification of glutinous substance 298 allows portions of the sealant plug to be severed during removal steps. Use of removable components (e.g. side cover 110, and tip portion 106) allows access to the sealant plugs (i.e. first sealant plug 302, second sealant plug 304, and third sealant plug 300) at key geometries of applicator 100. Severing first sealant plug 302 from second sealant plug 304 allows second sealant plug 304 to be pulled from applicator 100 without being trapped against first junction 150. Similarly, severing first sealant plug 302 from third sealant plug 300 allows both first sealant plug 302 and third sealant plug 300 to be removed without being trapped against second junction 310.

Referring generally to FIGS. 22A-22B and particularly to, e.g., FIGS. 13 through 15, according to method 500, separating first sealant plug 302 from base portion 111 of first body portion 102 comprises (block 532) separating a first portion of first sealant plug 302 from first sensor-port wall 119 of first sensor port 118 of applicator 100 and separating a second portion of first sealant plug 302 from second sensor-port wall 121 of second sensor port 120 of applicator 100. The preceding subject matter of this paragraph characterizes example 32 of the present disclosure, wherein example 32 also includes the subject matter according to example 31, above.

Separating first sealant plug 302 from first sensor-port wall 119 and second sensor-port wall 121 prevents first sealant plug 302 from becoming stuck in first sensor port 118 or second sensor port 120.

Referring generally to FIGS. 22A-22B and particularly to, e.g., FIGS. 16 through 18, according to method 500, glutinous substance 298 that has solidified further comprises fourth sealant plug 306, integral with second sealant plug 304 and located in nozzle portion 192 of tip portion 106. Method 500 further comprises (block 520) removing tip portion 106 from inner sleeve 210, coaxial with tip portion 106, to expose fourth sealant plug 306. Method 500 also comprises severing fourth sealant plug 306 from second sealant plug 304. The preceding subject matter of this paragraph characterizes example 33 of the present disclosure, wherein example 33 also includes the subject matter according to example 31 or 32, above.

Severing fourth sealant plug 306 from second sealant plug 304 (at junction 308 therebetween) allows inner sleeve 210 to be removed in a later step without being trapped by fourth sealant plug 306.

Referring generally to FIGS. 22A-22B and particularly to, e.g., FIGS. 17 through 18, according to method 500, detaching tip portion 106 of applicator 100 from second body portion 104 comprises (block 528) disengaging first circlip 284 from proximal connector portion 188 of tip portion 106. The preceding subject matter of this paragraph characterizes example 34 of the present disclosure, wherein example 34 also includes the subject matter according to any one of examples 31 to 33, above.

Use of first circlip 284 provides a secure and reliable connection, and allows tip portion 106 to be detached from second body portion 104 without interference from solidified glutinous substance 298.

Referring generally to FIGS. 22A-22B and particularly to, e.g., FIGS. 10 through 12, according to method 500, (block 530) proximal connector portion 188 of tip portion 106 interfaces with distal connector portion 160 of second body portion 104. The preceding subject matter of this paragraph characterizes example 35 of the present disclosure, wherein example 35 also includes the subject matter according to example 34, above.

Interfacing proximal connector portion 188 with distal connector portion 160 provides a reliable, convenient, and secure connection between tip portion 106 and second body portion 104.

Referring generally to FIGS. 22A-22B and particularly to, e.g., FIG. 2, according to method 500, detaching side cover 110 from base portion 111 of first body portion 102 comprises (block 524) unfastening one or more fasteners 122 from side cover 110. The preceding subject matter of this paragraph characterizes example 36 of the present disclosure, wherein example 36 also includes the subject matter according to any one of examples 31 to 35, above.

Use of fasteners 122 allows first body portion 102 to be more securely connected to side cover 110, which interfaces with pressurized first cavity 114 during operation of applicator 100.

Fasteners 122 may include any suitable fastening device, such as bolts, screws, clips, and/or the like, or any combination of these. In the example shown in the drawings, fasteners 122 include bolts having corresponding nuts, wherein the bolts are configured to pass through openings 124 in base portion 111 and corresponding openings 126 in side cover 110.

Referring generally to FIGS. 22A-22B and particularly to, e.g., FIG. 15, according to method 500, (block 526) detaching side cover 110 from base portion 111 of first body portion 102 exposes first junction 150 between first body portion 102 and second body portion 104. The preceding subject matter of this paragraph characterizes example 37 of the present disclosure, wherein example 37 also includes the subject matter according to any one of examples 31 to 36, above.

Exposing first junction 150 facilitates easy access in order that first sealant plug 302 can be severed from second sealant plug 304. For example, a knife might be used to cut first sealant plug 302 from second sealant plug 304.

Referring generally to FIGS. 22A-22B and particularly to, e.g., FIGS. 16 through 17, method 500 further comprises (block 522) detaching actuator interface 108 of applicator 100 from second body portion 104. The preceding subject matter of this paragraph characterizes example 38 of the present disclosure, wherein example 38 also includes the subject matter according to any one of examples 31 to 37, above.

Detaching actuator interface 108 allows complete clearance of glutinous substance 298 from applicator 100, and ensures second sealant plug 304 is not stuck to actuator interface.

Examples of the present disclosure may be described in the context of aircraft manufacturing and service method 600 as shown in FIG. 23 and aircraft 602 as shown in FIG. 24. During pre-production, illustrative method 600 may include specification and design (block 604) of aircraft 602 and material procurement (block 606). During production, component and subassembly manufacturing (block 608) and system integration (block 610) of aircraft 602 may take place. Thereafter, aircraft 602 may go through certification and delivery (block 612) to be placed in service (block 614). While in service, aircraft 602 may be scheduled for routine maintenance and service (block 616). Routine maintenance and service may include modification, reconfiguration, refurbishment, etc. of one or more systems of aircraft 602.

Each of the processes of illustrative method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 24, aircraft 602 produced by illustrative method 600 may include airframe 618 with a plurality of high-level systems 620 and interior 622. Examples of high-level systems 620 include one or more of propulsion system 624, electrical system 626, hydraulic system 628, and environmental system 630. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 600. For example, components or subassemblies corresponding to component and subassembly manufacturing (block 608) may be fabricated or manufactured in a manner similar to components or subassemblies produced while aircraft 602 is in service (block 614). Also, one or more examples of the apparatus(es), method(s), or combination thereof may be utilized during production stages 608 and 610, for example, by substantially expediting assembly of or reducing the cost of aircraft 602. Similarly, one or more examples of the apparatus or method realizations, or a combination thereof, may be utilized, for example and without limitation, while aircraft 602 is in service (block 614) and/or during maintenance and service (block 616).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of removing a glutinous substance from an applicator, the method comprising:

removing an actuator and a plunger, extending from the actuator, from the applicator before the glutinous substance has solidified;

allowing the glutinous substance to solidify inside the applicator, such that the glutinous substance that has solidified comprises a first sealant plug, located inside a first body portion of the applicator, a second sealant plug, integral with the first sealant plug and located partially inside a second body portion of the applicator, and a third sealant plug, integral with the first sealant plug and located inside an end-effector interface, extending from a base portion of the first body portion;

detaching a side cover from the base portion of the first body portion to expose the first sealant plug;

severing the first sealant plug from the second sealant plug at a first junction between the first body portion and the second body portion;

severing the first sealant plug from the third sealant plug at a second junction between the base portion of the first body portion and the end-effector interface;

detaching a tip portion of the applicator from the second body portion to expose a portion of the second sealant plug;

extracting the second sealant plug from the second body portion by pulling the portion of the second sealant plug, exposed by detaching the tip portion from the second body portion away from the second body portion in a direction along the second body portion;

separating the first sealant plug from the base portion of the first body portion; and extracting the third sealant plug from the end-effector interface of the first body portion.

2. The method according to claim 1, wherein separating the first sealant plug from the base portion of the first body portion comprises separating a first portion of the first sealant plug from a first sensor-port wall of a first sensor port of the applicator and separating a second portion of the first sealant plug from a second sensor-port wall of a second sensor port of the applicator.

3. The method according to claim 2, wherein the glutinous substance that has solidified further comprises a fourth sealant plug, integral with the second sealant plug and located in a nozzle portion of the tip portion, the method further comprising:

removing the tip portion from an inner sleeve, coaxial with the tip portion, to expose the fourth sealant plug; and severing the fourth sealant plug from the second sealant plug.

4. The method according to claim 2, wherein detaching the side cover from the base portion of the first body portion exposes the first junction between the first body portion and the second body portion.

5. The method according to claim 2, wherein detaching the tip portion of the applicator from the second body portion comprises disengaging a first circlip from a proximal connector portion of the tip portion.

6. The method according to claim 1, wherein detaching the side cover from the base portion of the first body portion exposes the first junction between the first body portion and the second body portion.

7. The method according to claim 6, further comprising detaching an actuator interface of the applicator from the second body portion.

8. The method according to claim 1, wherein the glutinous substance that has solidified further comprises a fourth sealant plug, integral with the second sealant plug and located in a nozzle portion of the tip portion, the method further comprising:

removing the tip portion from an inner sleeve, coaxial with the tip portion, to expose the fourth sealant plug; and severing the fourth sealant plug from the second sealant plug.

9. The method according to claim 8, wherein detaching the tip portion of the applicator from the second body portion comprises disengaging a first circlip from a proximal connector portion of the tip portion.

10. The method according to claim 8, further comprising detaching an actuator interface of the applicator from the second body portion.

11. The method according to claim 8, wherein detaching the side cover from the base portion of the first body portion exposes the first junction between the first body portion and the second body portion.

12. The method according to claim 1, wherein detaching the tip portion of the applicator from the second body portion comprises disengaging a first circlip from a proximal connector portion of the tip portion.

13. The method according to claim 12, wherein the proximal connector portion of the tip portion interfaces with a distal connector portion of the second body portion.

14. The method according to claim 12, wherein detaching the side cover from the base portion of the first body portion comprises unfastening one or more fasteners from the side cover.

15. The method according to claim 12, further comprising detaching an actuator interface of the applicator from the second body portion.

16. The method according to claim 12, wherein detaching the side cover from the base portion of the first body portion exposes the first junction between the first body portion and the second body portion.

17. The method according to claim 1, wherein detaching the side cover from the base portion of the first body portion comprises unfastening one or more fasteners from the side cover.

18. The method according to claim 17, further comprising detaching an actuator interface of the applicator from the second body portion.

19. The method according to claim 17, wherein detaching the side cover from the base portion of the first body portion exposes the first junction between the first body portion and the second body portion.

20. The method according to claim 1, further comprising detaching an actuator interface of the applicator from the second body portion.

* * * * *